(12) United States Patent
Huang et al.

(10) Patent No.: US 12,413,804 B2
(45) Date of Patent: Sep. 9, 2025

(54) CONTENT CONTINUATION METHOD AND ELECTRONIC DEVICE

(71) Applicant: HUAWEI TECHNOLOGIES CO., LTD., Guangdong (CN)

(72) Inventors: Liwei Huang, Shenzhen (CN); Kai Qian, Shenzhen (CN); Yumin Mao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 17/771,034

(22) PCT Filed: Oct. 23, 2020

(86) PCT No.: PCT/CN2020/123399
§ 371 (c)(1),
(2) Date: Apr. 22, 2022

(87) PCT Pub. No.: WO2021/078284
PCT Pub. Date: Apr. 29, 2021

(65) Prior Publication Data
US 2022/0400305 A1    Dec. 15, 2022

(30) Foreign Application Priority Data
Oct. 24, 2019    (CN) .......................... 201911017664.8

(51) Int. Cl.
*H04N 21/43*    (2011.01)
*G06F 3/14*    (2006.01)
(Continued)

(52) U.S. Cl.
CPC ..... *H04N 21/43072* (2020.08); *G06F 3/1454* (2013.01); *H04M 1/72409* (2021.01); *H04N 21/43078* (2020.08); *H04M 1/72412* (2021.01)

(58) Field of Classification Search
CPC ...... H04N 21/43072; H04N 21/43078; H04M 1/72409; H04M 1/72412; G06F 3/1454
See application file for complete search history.

(56) References Cited

U.S. PATENT DOCUMENTS 9,892,755 B1    2/2018    Layman et al.
10,291,952 B2    5/2019    Lau et al.
(Continued)

FOREIGN PATENT DOCUMENTS

CN    102510392 A    6/2012
CN    105828139 A    8/2016
(Continued)

OTHER PUBLICATIONS

Sangeun Oh et al., FLUID: Flexible User Interface Distribution for Ubiquitous Multi-device Interaction, MobiCom 19, Oct. 21-25, 2019, Los Cabos, Mexico, 16 pages.
(Continued)

*Primary Examiner* — Randy A Flynn

(57) ABSTRACT

The method includes: A first electronic device displays a control center on a first interface, where the control center includes a device list including one or more electronic devices, and the one or more electronic devices and the first electronic device are in a same content continuation system. The first electronic device receives a first selection operation of selecting a second electronic device from the one or more electronic devices by a user. In response to the first selection operation, the first electronic device determines whether the first electronic device is a source device or a target device of a current content continuation task. If the first electronic device is the target device of the current content continuation task, the first electronic device switches content in the second electronic device to the first electronic device for continuous playing.

13 Claims, 36 Drawing Sheets

(51) Int. Cl.
  *H04M 1/72409*    (2021.01)
  *H04M 1/72412*    (2021.01)

(56) References Cited

U.S. PATENT DOCUMENTS

| | | | |
|---|---|---|---|
| 2010/0169791 | A1 | 7/2010 | Pering et al. |
| 2013/0342759 | A1 | 12/2013 | Sahashi |
| 2015/0095419 | A1 | 4/2015 | Anantharaman et al. |
| 2016/0077710 | A1* | 3/2016 | Lewis ............... G06F 3/011 715/716 |
| 2017/0168667 | A1* | 6/2017 | Jeon ................ H04N 21/4131 |
| 2018/0249013 | A1* | 8/2018 | Jang .................. H04L 65/1069 |
| 2018/0335903 | A1* | 11/2018 | Coffman ............ G06F 3/0482 |
| 2019/0014205 | A1* | 1/2019 | Miloseski ......... G06F 3/04817 |
| 2019/0124159 | A1* | 4/2019 | Alsina ............... H04N 21/6125 |
| 2019/0272142 | A1 | 9/2019 | Choi et al. |
| 2020/0053399 | A1* | 2/2020 | Choi ................ H04N 21/4108 |
| 2022/0004315 | A1 | 1/2022 | Zhang et al. |

FOREIGN PATENT DOCUMENTS

| | | |
|---|---|---|
| CN | 105892977 A | 8/2016 |
| CN | 107241640 A | 10/2017 |
| CN | 107529075 A | 12/2017 |
| CN | 107613373 A | 1/2018 |
| CN | 109287140 A | 1/2019 |
| CN | 109660842 A | 4/2019 |
| CN | 110248226 A | 9/2019 |
| WO | 2013190872 A1 | 12/2013 |
| WO | 2016060514 A1 | 4/2016 |
| WO | 2018223400 A1 | 12/2018 |

OTHER PUBLICATIONS

International Search Report and Written Opinion issued in PCT/CN2020/123399, dated Jan. 20, 2021, 10 pages.
Extended European Search Report issued in EP20878864.6, dated Nov. 2, 2022, 11 pages.
Office Action issued in CN201911017664.8, dated Jun. 8, 2021, 8 pages.
Office Action issued in CN201911017664.8, dated Nov. 2, 2021, 5 pages.

* cited by examiner

Target device

Target device

CONT. FROM FIG. 17(a)

Source device

CONTENT CONTINUATION METHOD AND ELECTRONIC DEVICE

CROSS REFERENCE TO RELATED APPLICATIONS

This application is a National Stage of International Application No. PCT/CN2020/123399, filed on Oct. 23, 2020, which claims priority to Chinese Patent Application No. 201911017664.8, filed on Oct. 24, 2019. Both of the aforementioned applications are hereby incorporated by reference in their entireties.

TECHNICAL FIELD

This application relates to the terminal field, and in particular, to a content continuation method and an electronic device.

BACKGROUND

With development of intelligent terminal technologies, a user or a home usually has a plurality of electronic devices, and the user often needs to switch between the plurality of electronic devices. For example, the user uses a mobile phone to watch a video on the way home, and the user may want to switch the video to a TV to continue watching it after arriving home. For another example, the user may use a notebook computer to work at home, and when leaving home, the user may want to switch a file in the notebook computer to a mobile phone to continue processing the file.

In this cross-device interaction scenario, the user usually needs to manually switch content played by one device to another device for continuation. For example, the user may use the mobile phone as a source device, manually search for other devices at home, and switch content such as a video in the mobile phone to a target device selected by the user for continuous playing. For another example, the user may alternatively use the mobile phone as a target device, manually operate another source device at home, and switch content played by the source device to the mobile phone for continuous playing. It is clear that this process of switching play content between a plurality of devices is relatively time-consuming and complex, thereby causing poor user experience.

SUMMARY

Embodiments of the present disclosure provides a content continuation method and an electronic device, to adapt to a current application scenario of switching content played by an electronic device to another device or switching content of another electronic device to the electronic device. This reduces operation complexity in performing cross-device interaction by a user, and improves user experience.

To achieve the foregoing objectives, the following example technical solutions are used in this application.

According to a first aspect, an embodiment of this application provides a content continuation method, including: A first electronic device may display a control center on a first interface, where the control center includes a device list including N (N is an integer greater than 0) electronic devices, and the N electronic devices and the first electronic device are located in a same content continuation system. Further, the first electronic device may receive a first selection operation of selecting a second electronic device from the N electronic devices by a user. In this case, in response to the first selection operation, the first electronic device may determine whether the first electronic device is a source device or a target device of a current content continuation task. If the first electronic device is the target device of the current content continuation task, the first electronic device may switch content in the second electronic device to the first electronic device for continuous playing.

In other words, when a content continuation task is to be performed, the user may quickly find, in the control center of the first electronic device, the second electronic device that currently needs to perform content continuation with the first electronic device. In addition, it may be determined, based on a current application scenario, whether a role of the first electronic device in the current content continuation task is a source device or a target device. When the first electronic device is the target device, the first electronic device may continuously play content in another electronic device (for example, the second electronic device) automatically. This reduces operation complexity of performing cross-device content continuation by the user, and improves user experience.

In a possible implementation, that the first electronic device switches content in the second electronic device to the first electronic device for continuous playing includes: The first electronic device may display an application list including M (M is an integer greater than 0) applications in the control center, where the M applications are applications in the second electronic device. In response to a second selection operation of selecting a first application from the M applications by the user, the first electronic device may switch the first application that is originally in the second electronic device to the first electronic device for running, so as to implement content continuation of the first application from the second electronic device to the first electronic device.

For example, the M applications may be applications that are being run on the second electronic device. In other words, the first electronic device may present, in the control center to the user, an application that is being run on the second electronic device. In this way, the user may select, from the control center, a specific application to be switched to the first electronic device for continuous running. In other words, by operating the control center of the target device (that is, the first electronic device), the user may quickly and conveniently switch the content in the source device (that is, the second electronic device) to the target device for continuous playing.

In a possible implementation, that the first electronic device determines whether the first electronic device is a source device or a target device of a current content continuation task includes: When an application to which the first interface belongs is an application of a preset type, the first electronic device determines that the source device of the current content continuation task is the first electronic device. When the application to which the first interface belongs is not the application of the preset type, the first electronic device determines that the target device of the current content continuation task is the first electronic device. In other words, the first electronic device may determine, based on currently played content, whether the role played by the first electronic device in the current content continuation task is the source device or the target device.

For example, the application of the preset type may include a video call application, a video play application, an office application, a game application, or an audio application.

In a possible implementation, after the first electronic device determines whether the first electronic device is the source device or the target device of the current content continuation task, the method further includes: If the first electronic device is the source device of the current continuation task, it indicates that the first interface that is being played by the first electronic device may be played by another electronic device. In this case, the first electronic device may switch display content and/or audio content on the first interface to the second electronic device selected by the user for continuous playing. The audio content on the first interface may be audio content played by the first electronic device when the first interface is displayed, for example, audio content synchronized with a video on the first interface, or audio content synchronized with lyrics on the first interface.

In a possible implementation, after the first electronic device switches the content on the first interface to the second electronic device for continuous playing, the method further includes: The first electronic device marks an identifier of the second electronic device in the control center. For example, the first electronic device may perform marking by modifying a size, a color, or transparency of the identifier of the second electronic device.

In a possible implementation, after the first electronic device switches the content on the first interface to the second electronic device for continuous playing, the method further includes: The first electronic device may display a second interface after exiting the first interface. When an application to which the second interface belongs is also the application of the preset type, it indicates that the second interface may also be continuously played by another electronic device. In this case, the first electronic device may display a push message on the second interface, where the push message includes identifiers of one or more electronic devices that are in the content continuation system and that may be configured to continuously play the second interface.

In a possible implementation, when the second interface is an interface of a video call application or a video play application, the push message includes an identifier of a large-screen device (for example, a smart TV, a notebook computer, or a tablet computer) in the content continuation system. When the second interface is an interface of an office application, the push message includes an identifier of an office device (for example, a notebook computer, a desktop computer, or a tablet computer) in the content continuation system. When the second interface is an interface of a game application, the push message includes an identifier of a display device (for example, a mobile phone or a tablet computer) in the content continuation system. When the second interface is an interface of an audio application, the push message includes an identifier of an audio output device (for example, a speaker or a vehicle-mounted device) in the content continuation system.

In a possible implementation, the push message may include an identifier of a third electronic device, and after the first electronic device displays the push message on the second interface, the method further includes: If it is detected that the user taps the identifier of the third electronic device, the first electronic device switches display content and/or audio content on the second interface to the third electronic device for continuous playing. If it is detected that the user performs a slide operation on the identifier of the third electronic device, the first electronic device may unfold the push message, and display, in the push message, a complete list of devices configured to continuously play the second interface, that is, an identifier of an electronic device other than the third electronic device.

In a possible implementation, after the first electronic device switches the display content and/or the audio content on the second interface to the third electronic device for continuous playing, the method further includes: The first electronic device may display a first card and a second card in the control center, where the first card includes a list of devices configured to continuously play the first interface, and the second card includes a list of devices configured to continuously play the second interface. The user may control one or more ongoing content continuation tasks of the first electronic device by using the cards.

In a possible implementation, the first interface includes a shortcut of a first contact, and the method further includes: In response to a preset operation entered by the user for the shortcut of the first contact, the first electronic device may display, on the first interface, an identifier of a fourth electronic device in the content continuation system, that is, recommend the user to use the fourth electronic device to continue a video call with the first contact. In response to an operation of dragging the shortcut of the first contact to the identifier of the fourth electronic device by the user, the first electronic device may switch content of the video call with the first contact to the fourth electronic device. For example, the first electronic device may open a video call app of the first electronic device to send a video call request to the first contact, and switch the video call app that is being run to the fourth electronic device for continuous playing. For example, the first electronic device may send a task of a video call with the first contact to the fourth electronic device, to trigger the fourth electronic device to open a video call app of the fourth electronic device to make a video call with the first contact. In this case, the first electronic device may switch the video call task to the fourth electronic device for running without opening the video call app.

In a possible implementation, that a first electronic device displays a control center on a first interface includes: In response to a first operation entered by the user on the first interface, the first electronic device displays a level-1 menu of the control center on the first interface. In response to a second operation entered by the user for the level-1 menu, the first electronic device displays a level-2 menu of the control center on the first interface.

According to a second aspect, an embodiment of this application provides an electronic device, for example, the foregoing first electronic device. The first electronic device includes a touchscreen, a communications module, one or more processors, a memory, and one or more computer programs. The processor is coupled to the touchscreen, the communications module, and the memory. The one or more computer programs are stored in the memory. When the first electronic device runs, the processor executes the one or more computer programs stored in the memory, so that the first electronic device performs the content continuation method in any one of the foregoing implementations.

According to a third aspect, an embodiment of this application provides an electronic device, for example, the foregoing second electronic device. The second electronic device includes a communications module, one or more processors, a memory, and one or more computer programs. The processor is coupled to the touchscreen, the communications module, and the memory. The one or more computer programs are stored in the memory. When the second electronic device runs, the processor executes the one or more computer programs stored in the memory, so that the second electronic device performs the following steps:

When a first electronic device is a target device of a current content continuation task, the second electronic device is a source device of the current content continuation task. In this case, the second electronic device may receive a first continuation instruction sent by the first electronic device, where the first electronic device and the second electronic device are located in a same content continuation system. In response to the first continuation instruction, the second electronic device may switch display content and/or audio content in a first application that is being run to the first electronic device for continuous playing.

Alternatively, when a first electronic device is a source device of a current content continuation task, the second electronic device is a target device of the current content continuation task. In this case, the second electronic device may receive a second continuation instruction sent by the first electronic device, where the first electronic device and the second electronic device are located in a same content continuation system. In response to the second continuation instruction, the second electronic device may continuously play display content and/or audio content on a first interface that is being displayed by the first electronic device.

According to a fourth aspect, an embodiment of this application provides a content continuation system, including the foregoing first electronic device and the foregoing second electronic device. Certainly, the content continuation system may further include another electronic device having a content continuation capability. This is not limited in the embodiments of this application.

According to a fifth aspect, an embodiment of this application provides a graphical user interface (GUI). The graphical user interface is stored in a first electronic device, the first electronic device includes a touchscreen, a communications module, a memory, and one or more processors, and the one or more processors are configured to execute one or more computer programs stored in the memory, so that the first electronic device performs the content continuation method in any one of the foregoing implementations.

According to a sixth aspect, an embodiment of this application provides a computer storage medium, including computer instructions. When the computer instructions are run on an electronic device (for example, the foregoing first electronic device or the foregoing second electronic device), the electronic device is enabled to perform the content continuation method in any one of the foregoing implementations.

According to a seventh aspect, an embodiment of this application provides a computer program product. When the computer program product is run on an electronic device (for example, the foregoing first electronic device or the foregoing second electronic device), the electronic device is enabled to perform the content continuation method in any one of the foregoing implementations.

It may be understood that the electronic device in the second aspect, the electronic device in the third aspect, the content continuation system in the fourth aspect, the graphical user interface in the fifth aspect, the computer storage medium in the sixth aspect, and the computer program product in the seventh aspect that are provided above are all configured to perform the corresponding method provided above. Therefore, for beneficial effects that can be achieved, refer to beneficial effects in the corresponding method provided above.

DESCRIPTION OF EMBODIMENTS

The following describes implementations of the embodiments in detail with reference to the accompanying drawings.

Figure 1:
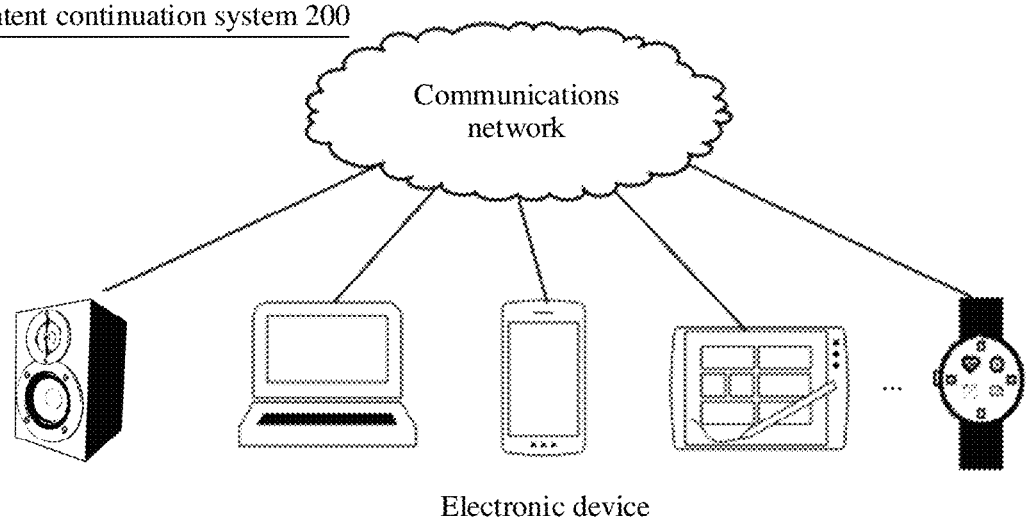
FIG. 1 is a schematic diagram of an architecture of a content continuation system according to an embodiment of this application.

A content continuation method provided in the embodiments of this application may be applied to a content continuation system 200 shown in FIG. 1. The content continuation system 200 may include N (N is an integer greater than 1) electronic devices. The N electronic devices may be interconnected over a communications network.

For example, the communications network may be a wired network, or may be a wireless network. For example, the communications network may be a local area network (LAN), or may be a wide area network (WAN), for example, the internet. The foregoing communications network may be implemented by using any known network communications protocol. The foregoing network communications protocol may be various wired or wireless communications protocols, such as Ethernet, a universal serial bus (USB), FireWire, a global system for mobile communications (GSM), a general packet radio service (GPRS), code division multiple access (CDMA), wideband code division multiple access (WCDMA), time-division code division multiple access (TD-CDMA), long term evolution (LTE), Bluetooth, wireless fidelity (Wi-Fi), NFC, voice over internet protocol (VoIP), a communications protocol that supports a network slicing architecture, or any other suitable communications protocol.

For example, the electronic devices in the content continuation system 200 may be a plurality of electronic devices that access a same Wi-Fi network. Alternatively, the electronic devices in the content continuation system 200 may be a plurality of electronic devices that are logged in to by using a same account (for example, a Huawei account). Alternatively, the electronic devices in the content continuation system 200 may be a plurality of electronic devices that access a same Wi-Fi network and that are logged in to by using a same account. This is not limited in the embodiments of this application.

The content continuation system 200 including a plurality of electronic devices that access a same Wi-Fi network and that are logged in to by using a same account is used as an example. The content continuation system 200 may include a first electronic device, for example, a mobile phone or a tablet computer. A smart home app configured to manage another electronic device in the content continuation system 200 may be installed in the first electronic device. A user may add or delete an electronic device other than the first electronic device in the content continuation system 200 by using the smart home app. For example, a to-be-added electronic device is a smart speaker. After a user enables the smart speaker to access a Wi-Fi network accessed by the mobile phone, the first electronic device may find the smart speaker in the Wi-Fi network by using the smart home app. Further, the first electronic device may help, in a server, register the smart speaker as an electronic device with an account bound to the smart home app, so that the first electronic device and the smart speaker are bound to a same account. Subsequently, when the user logs in to the smart home app in the first electronic device again, if the smart speaker has accessed the Wi-Fi network accessed by the mobile phone, it indicates that both the first electronic device and the smart speaker have joined the content continuation system 200. In this case, the first electronic device may display an identifier of the smart speaker, to prompt the user that the first electronic device may perform content continuation with the smart speaker.

It should be noted that content continuation is a process in which an electronic device switches content (for example, a picture, text, audio, a video, an animation, a web page, or an application) that is being played by the electronic device to another electronic device for continuous playing. The term "play" may be specifically playing audio, playing a video, playing a picture, playing a document, playing a function or a task in an application, or the like. This is not limited in the embodiments of this application. For example, when the user chooses to use the mobile phone to perform content continuation with a smart TV, the mobile phone may switch both a picture and audio of a video A in a video app that is being run to the smart TV for continuous playing. In this case, if the mobile phone exits the video app and runs another application, the video A played by the smart TV is not affected.

In the embodiments of this application, an example in which the mobile phone is an electronic device in the content continuation system 200 is used. The mobile phone may display, in a control center, one or more electronic devices in the content continuation system 200 in real time, so that the user can quickly find a corresponding electronic device to perform content continuation with the mobile phone.

Figure 2:
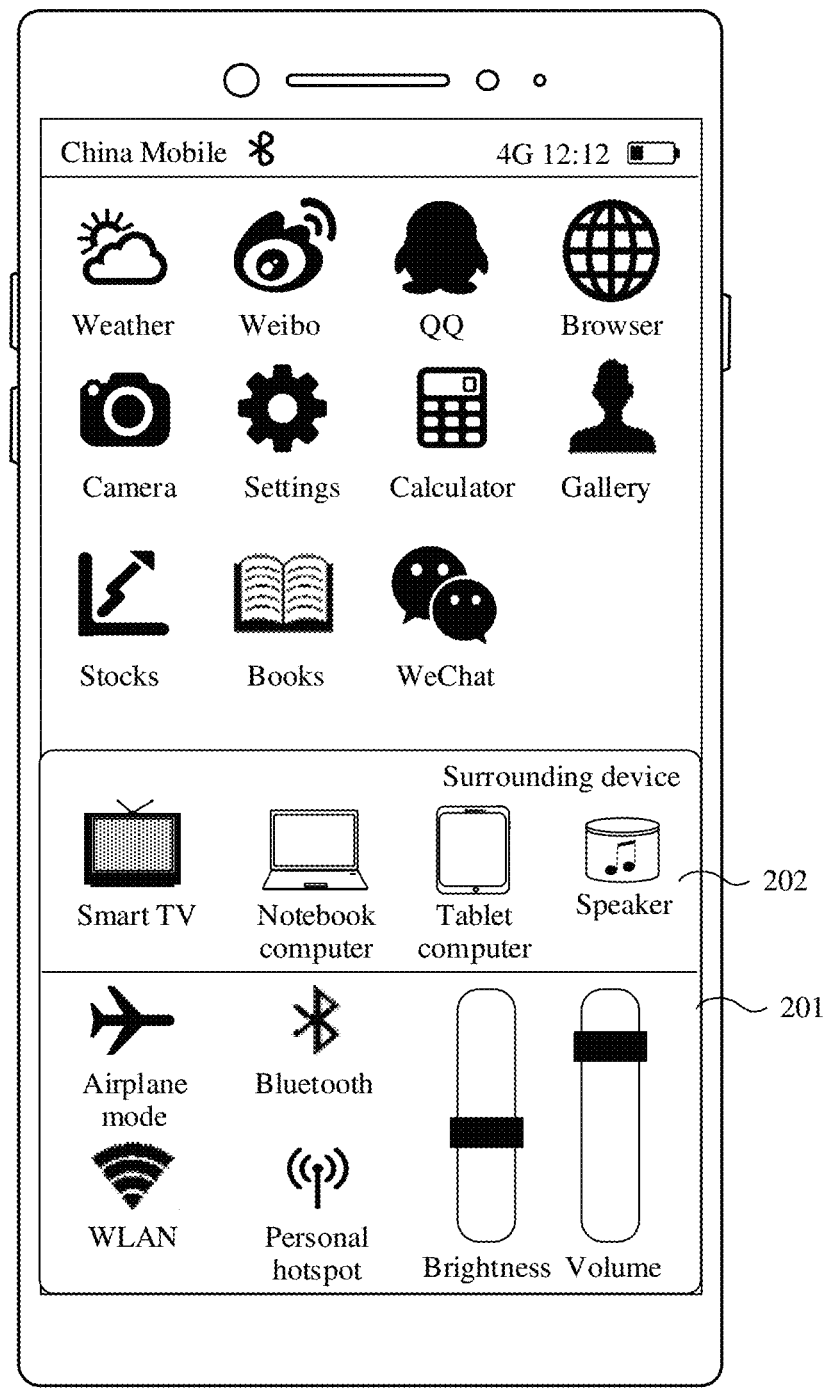
FIG. 2 is a schematic diagram 1 of an example application scenario of a content continuation method according to an embodiment of this application.

For example, as shown in FIG. 2, the mobile phone may display a control center 201 (that is, open the control center) in response to a preset operation (for example, a pull-up operation or a pull-down operation) entered by the user on a current display interface. The control center 201 may also be referred to as a pull-up menu or a pull-down menu. On-off buttons of some shortcut functions in the mobile phone may be set in the control center 201, for example, an on-off button of a Bluetooth function, an on-off button of a wireless local area network (WLAN) function, an on-off button of Flashlight, and on-off buttons of adjusting brightness and volume. This is not limited in the embodiments of this application.

In the embodiments of this application, still as shown in FIG. 2, the mobile phone may further display, in the control center 201, a device list 202 including one or more electronic devices that are currently located in a same content continuation system 200 as the mobile phone. For example, the mobile phone may search for an electronic device that accesses a same Wi-Fi network as the mobile phone, and display an identifier of the found electronic device in the device list 202. For another example, the mobile phone may search the server for an electronic device that is logged in to by using a same account (for example, a Huawei account) as the mobile phone, and display an identifier of the found electronic device in the device list 202. In this way, after opening the control center 201 of the mobile phone, the user may intuitively see one or more electronic devices in the current content continuation system 200, and all these devices may be configured to perform content continuation with the mobile phone. Subsequently, the user may quickly and conveniently select, from the device list 202, a specific device that currently performs content continuation with the mobile phone.

Figure 3A:
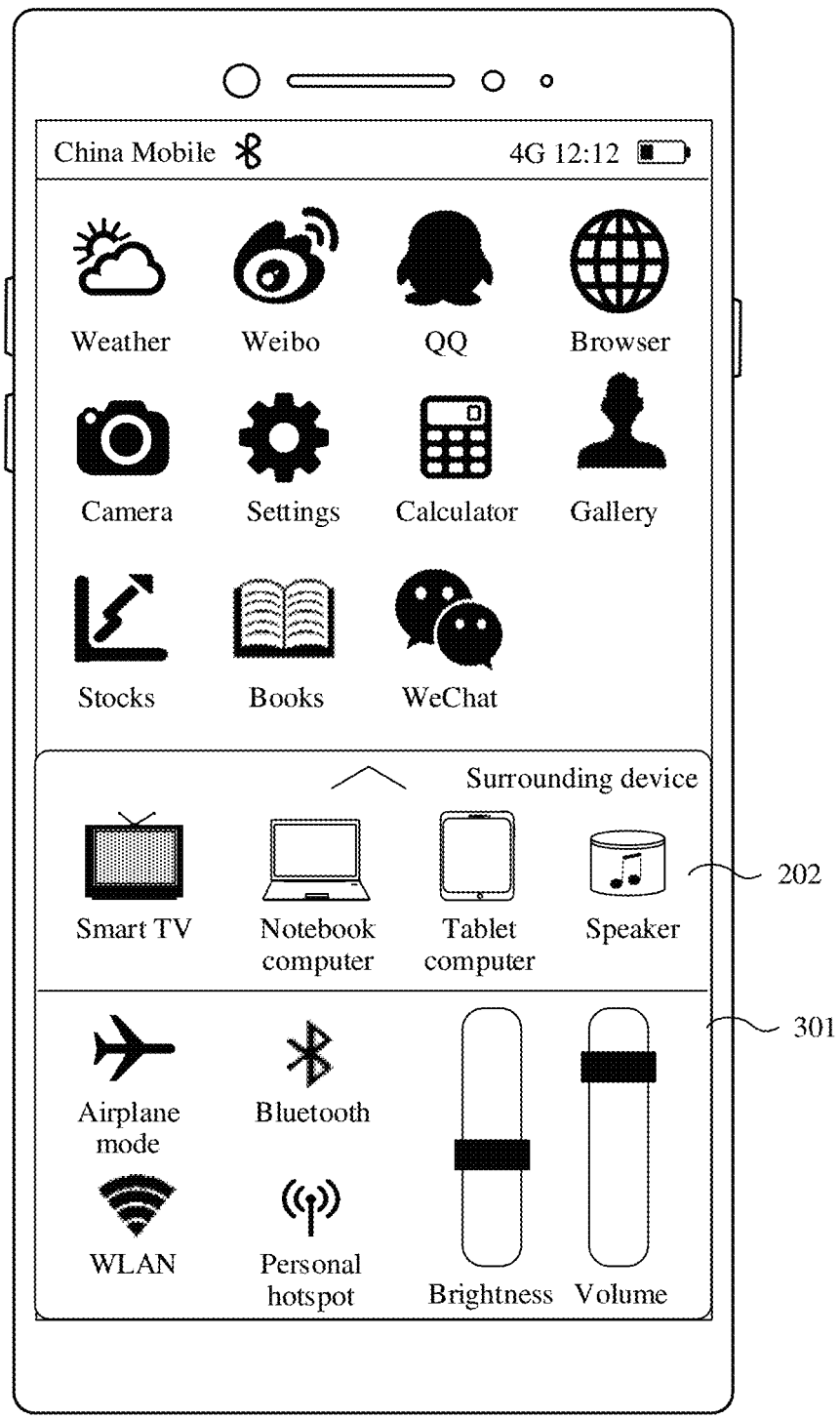
FIG. 3(a) and FIG. 3(b) are a schematic diagram 2 of an example application scenario of a content continuation method according to an embodiment of this application.
Figure 3B:
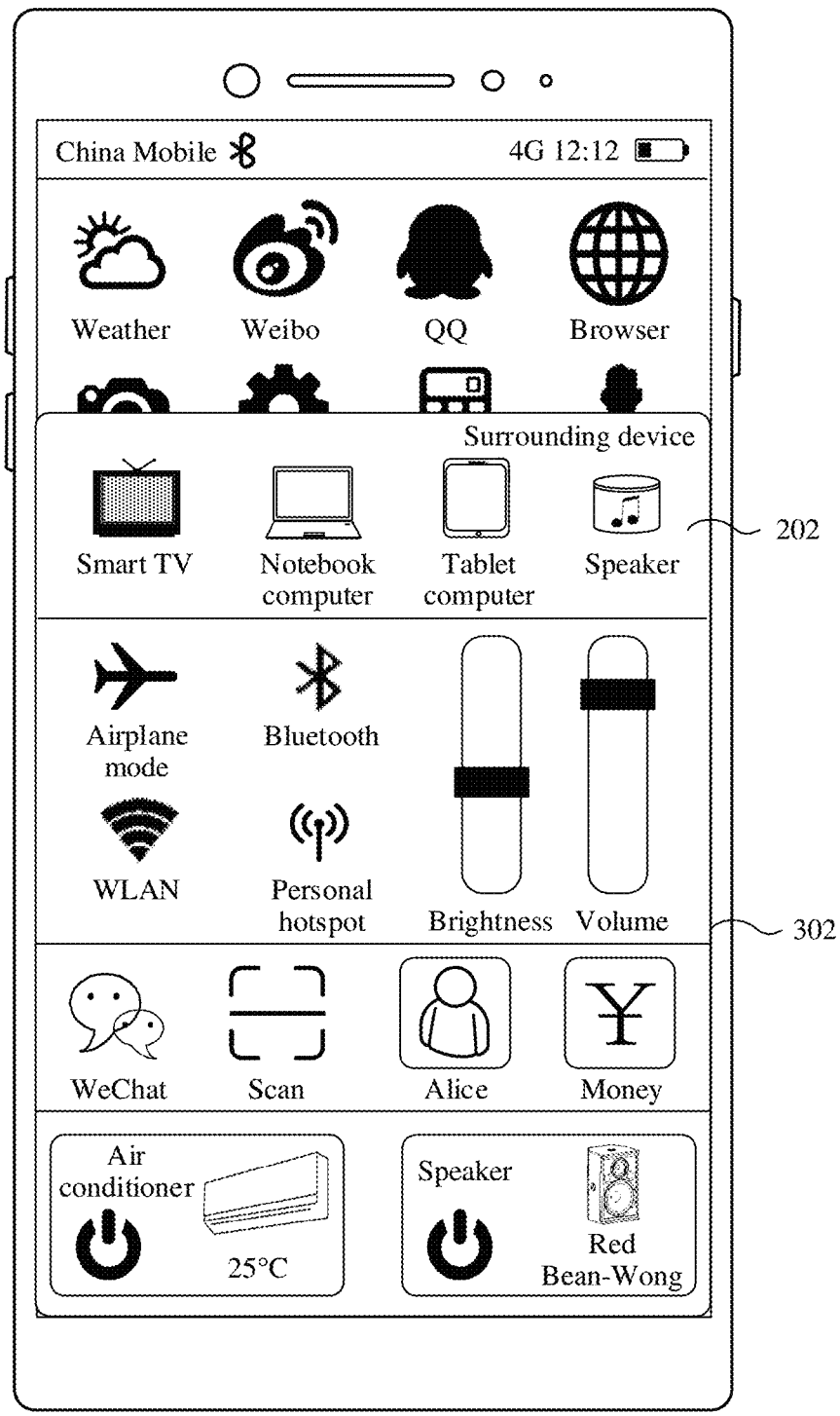

In some embodiments, the mobile phone may further display the control center 201 in a multi-level menu manner. A level-2 menu display manner is used as an example. As shown in FIG. 3(a), after detecting that the user opens a first pull-up operation of the control center, the mobile phone may display a level-1 menu 301 of the control center. The level-1 menu 301 may include the device list 202 and an on-off button of a shortcut function. If it is detected that the user enters a second pull-up operation for the level-1 menu 301, as shown in FIG. 3(b), the mobile phone may display a level-2 menu 302 of the control center. The level-2 menu 302 may be a form displayed after the level-1 menu 301 of the control center is fully unfolded, and the level-2 menu 302 may include more content than the level-1 menu 301. For example, the level-2 menu 302 may further include a shortcut entry of an application or an application function in the application. The user may quickly open the application or the function in the application by using the shortcut entry. For another example, the level-2 menu 302 may further include management cards of one or more smart home devices bound to the mobile phone. The user may quickly manage the smart home devices by using these management cards.

Certainly, a person skilled in the art may set, based on actual experience or an actual application scenario, a quantity of levels of menus specifically included in the control center and specific display content of each level of menu. This is not limited in the embodiments of this application.

In the embodiments of this application, after the mobile phone displays the device list 202 in the control center 201, with reference to a current application scenario, the mobile phone may switch, in response to a selection operation performed by the user in the device list 202, content in the mobile phone to an electronic device selected by the user for continuous playing, or switch, in response to a selection operation performed by the user in the device list 202, content in an electronic device selected by the user to the mobile phone for continuous playing.

For example, the user selects an electronic device such as a smart TV from the device list 202 shown in FIG. 2. After detecting that the user selects the smart TV from the device list 202, the mobile phone may identify whether content currently played by the mobile phone is suitable for being continuously played by the smart TV. If the currently played content is suitable for being continuously played by the smart TV, the mobile phone may be used as a source device to switch the content that is being played by the mobile phone to the smart TV (that is, a target device) for playing. Correspondingly, if the currently played content is not suitable for being continuously played by the smart TV, the mobile phone may use the smart TV selected by the user as a source device to switch content in the smart TV to the mobile phone (that is, a target device) for playing.

For example, after displaying the control center 201, the mobile phone may search for a specific application or a specific application interface that is currently being run in the foreground. If the application (or application interface) is a preset application (or application interface) applicable to continuation, the mobile phone may determine that the currently played content can be continued by another electronic device. In this case, the mobile phone may be used as a source device to switch the currently played content to an electronic device selected by the user for continuous playing. Otherwise, the mobile phone may determine that the currently played content is suitable for being continued by another electronic device. In this case, the mobile phone may display, in the control center 201 to the user, content in an electronic device selected by the user, so that the user can use the electronic device as a source device to switch content in the electronic device to the mobile phone (that is, a target device) for playing.

Certainly, the mobile phone may alternatively determine, in another manner, whether the currently played content can be continued by another electronic device. This is described in detail in a subsequent embodiment.

To be specific, after the user selects, from the control center of the mobile phone, an electronic device that currently needs to perform content continuation with the mobile phone, the mobile phone may intelligently determine whether the user currently needs to switch content in the mobile phone to another electronic device for continuous playing or whether the user currently needs to switch content in another electronic device to the mobile phone for continuous playing, that is, determine whether a role of the mobile phone in the current content continuation task is a source device or a target device. When the mobile phone is the source device, the mobile phone may automatically switch content in the mobile phone to another electronic device for continuous playing. When the mobile phone is the target device, the mobile phone may receive content from another device and continuously play the content in the mobile phone.

In this way, when a content continuation task is to be performed, the user may quickly find, from the control center of the mobile phone, an electronic device that currently needs to perform content continuation with the mobile phone. Based on a current application scenario, the mobile phone may further quickly switch content in the mobile phone to an electronic device selected by the user for continuous playing, or receive content from another device and continue playing the content in the mobile phone. This reduces operation complexity of performing cross-device content continuation by the user, and improves user experience.

For example, the electronic device in the content continuation system 200 may be specifically a mobile phone, a tablet computer, a smart TV, a notebook computer, a smart home device (for example, a smart TV, a smart air conditioner, a smart refrigerator, a smart speaker, a smart lamp, or a smart curtain), a wearable electronic device, a vehicle-mounted device, or a virtual reality device. This is not limited in the embodiments of this application.

Figure 4:
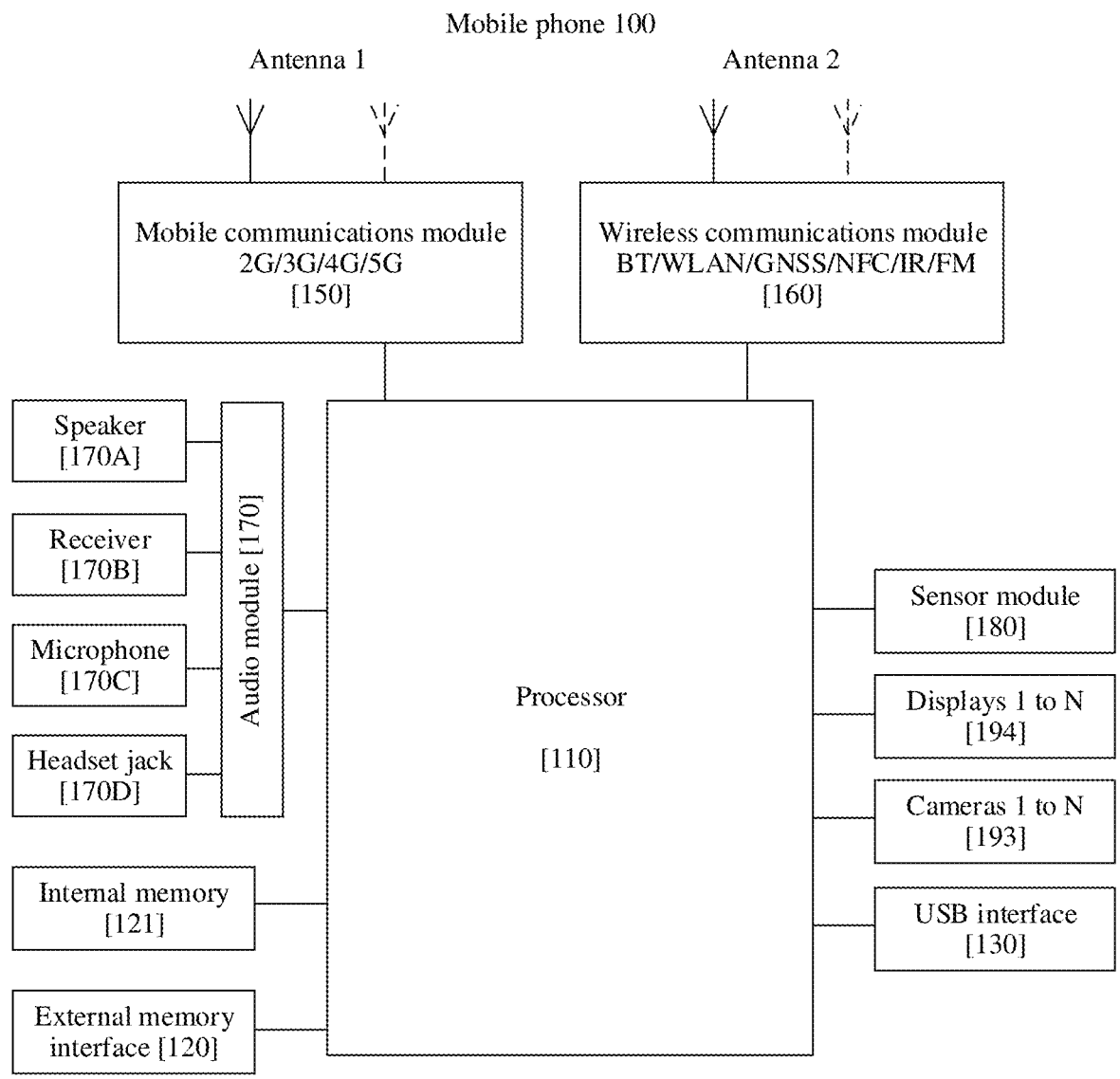
FIG. 4 is a schematic diagram 1 of a structure of an example electronic device according to an embodiment of this application.

For example, a mobile phone 100 is used as the foregoing electronic device. FIG. 4 is a schematic diagram of a structure of the mobile phone 100.

The mobile phone 100 may include a processor 110, an external memory interface 120, an internal memory 121, a universal serial bus (USB) interface 130, an antenna 1, an antenna 2, a mobile communications module 150, a wireless communications module 160, an audio module 170, a speaker 170A, a receiver 170B, a microphone 170C, a headset jack 170D, a sensor module 180, and the like.

It may be understood that a structure shown in the embodiments of the present invention does not constitute a specific limitation on the mobile phone 100. In some other embodiments of this application, the mobile phone 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM)

interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

A wireless communication function of the mobile phone 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile phone 100 may be configured to cover one or more communications frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the mobile phone 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a wireless communication solution that includes a wireless local area network (WLAN) (for example, a wireless fidelity (Wi-Fi) network), Bluetooth (Bluetooth, BT), a global navigation satellite system (GNSS), frequency modulation (FM), a near field communication (NFC) technology, an infrared (IR) technology, or the like and that is applied to the mobile phone 100. The wireless communications module 160 may be one or more components integrating at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave by using the antenna 2 for radiation.

In some embodiments, in the mobile phone 100, the antenna 1 and the mobile communications module 150 are coupled, and the antenna 2 and the wireless communications module 160 are coupled, so that the mobile phone 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile phone 100 implements a display function by using the GPU, a display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute a program instruction to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the mobile phone 100 may include one or N displays 194, where N is a positive integer greater than 1.

The mobile phone 100 may implement a photographing function by using the ISP, a camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the mobile phone 100 may include one or N cameras 193, where N is a positive integer greater than 1.

The digital signal processor is configured to process a digital signal, and may process another digital signal in addition to the digital image signal. For example, when the mobile phone 100 selects a frequency, the digital signal processor is configured to perform Fourier transform on frequency energy, and the like.

The video codec is configured to: compress or decompress a digital video. The mobile phone 100 may support one or more video codecs. In this way, the mobile phone 100 can play or record videos in a plurality of coding formats, for example, moving picture experts group (MPEG)-1, MPEG-2, MPEG-3, and MPEG-4.

The external memory interface 120 may be configured to connect to an external storage card such as a micro SD card, to extend a storage capability of the mobile phone 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs instructions stored in the internal memory 121, to implement various function applications and data processing of the mobile phone 100. The internal memory 121 may include a program storage area and a data storage area. The program storage area may store an operating system, an application required by at least one function (for example, a sound playing function or an image playing function), and the like. The data storage area may store data (for example, audio data or an address book) created during use of the mobile phone 100, and the like. In addition, the internal memory 121 may include a high-speed random access memory, and may further include a nonvolatile memory, for example, at least one magnetic disk storage device, a flash memory, or a universal flash storage (UFS).

The mobile phone 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "horn", is configured to convert an electrical audio signal into a sound signal. The mobile phone 100 may listen to music or answer a hands-free call through the speaker 170A.

The receiver 170B, also referred to as an "earpiece", is configured to convert an electrical audio signal into a sound signal. When a call is answered or voice information is received by using the mobile phone 100, the receiver 170B may be put close to a human ear to listen to a voice.

The microphone 170C, also referred to as a "mike", is configured to convert a sound signal into an electrical signal. When making a call or sending voice information, a user may make a sound close to the microphone 170C through the mouth of the user, to input a sound signal to the microphone 170C. At least one microphone 170C may be disposed in the mobile phone 100. In some other embodiments, two microphones 170C may be disposed in the mobile phone 100, to collect a sound signal and further implement a noise reduction function. In some other embodiments, three, four, or more microphones 170C may alternatively be disposed in the mobile phone 100, to collect a sound signal, reduce noise, further identify a sound source, implement a directional recording function, and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The sensor module 180 may include a pressure sensor, a gyro sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

Certainly, the mobile phone 100 may further include a charging management module, a power management module, a battery, a button, an indicator, one or more SIM card interfaces, and the like. This is not limited in the embodiments of this application.

The following describes in detail a content continuation method provided in the embodiments of this application with reference to the accompanying drawings by using an example in which a mobile phone is the foregoing electronic device.

Figure 5:
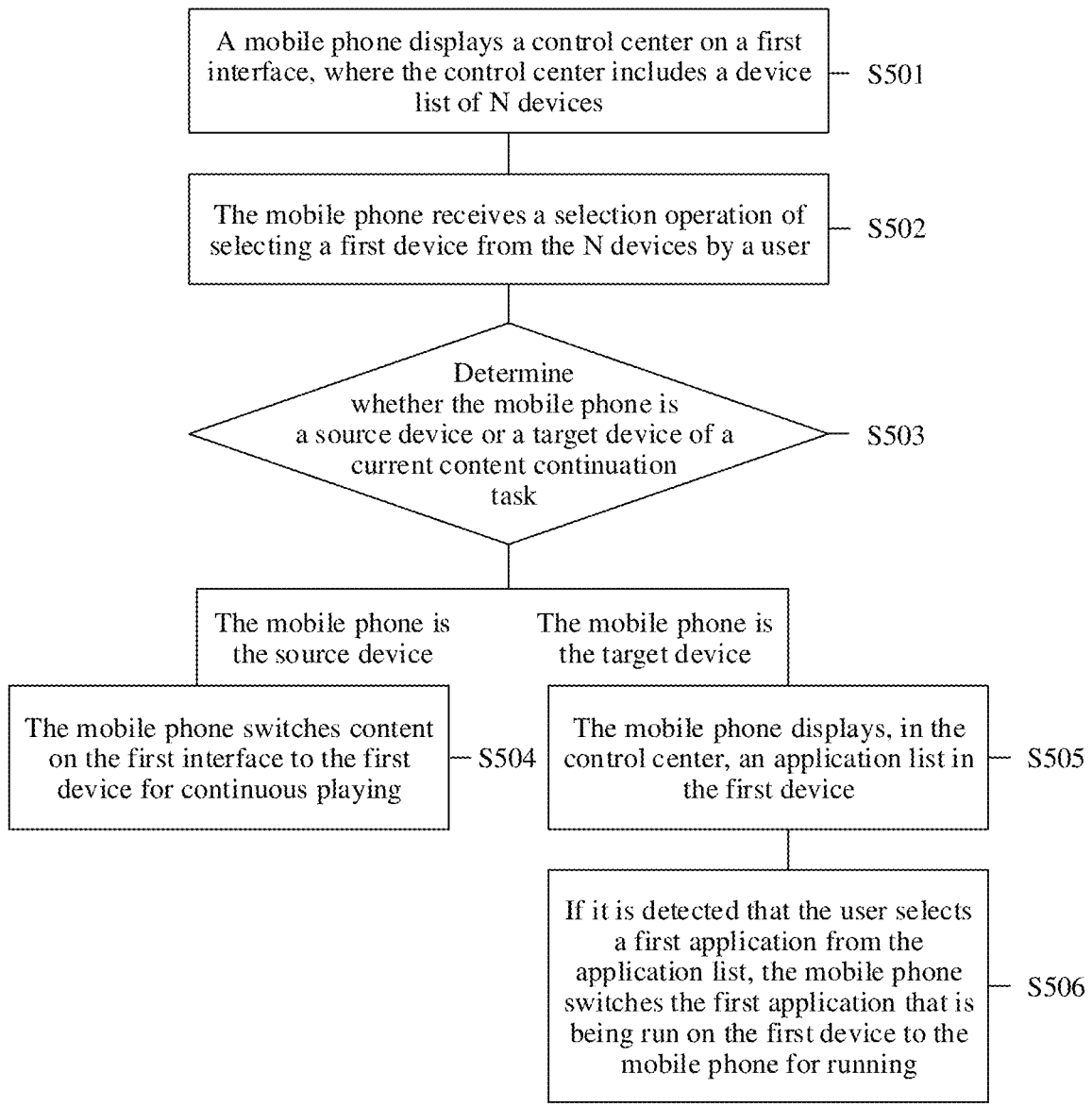
FIG. 5 is a schematic flowchart of an example content continuation method according to an embodiment of this application.

As shown in FIG. 5, the content continuation method provided in the embodiments of this application may include steps S501 to S506.

S501: The mobile phone displays a control center on a first interface, where the control center includes a device list of N devices, and each of the N devices may perform content continuation with the mobile phone.

The first interface may be any interface displayed by the mobile phone. For example, the first interface may be a home screen, a lock screen, or an application interface in any application of the mobile phone. In other words, when displaying any interface, the mobile phone may display the control center of the mobile phone in response to an operation of opening the control center by a user.

Figure 6A:
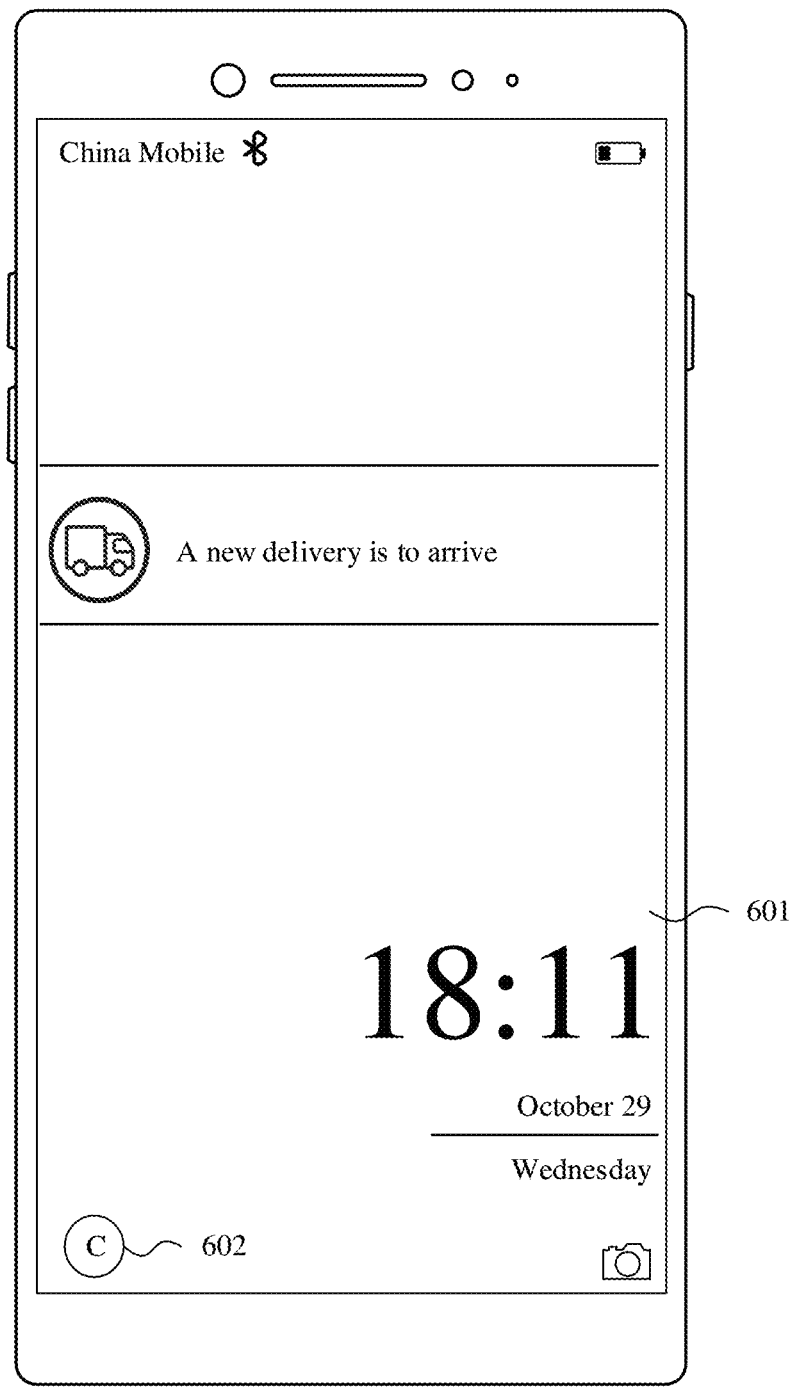
FIG. 6(a) and FIG. 6(b) are a schematic diagram 3 of an example application scenario of a content continuation method according to an embodiment of this application.
Figure 6B:
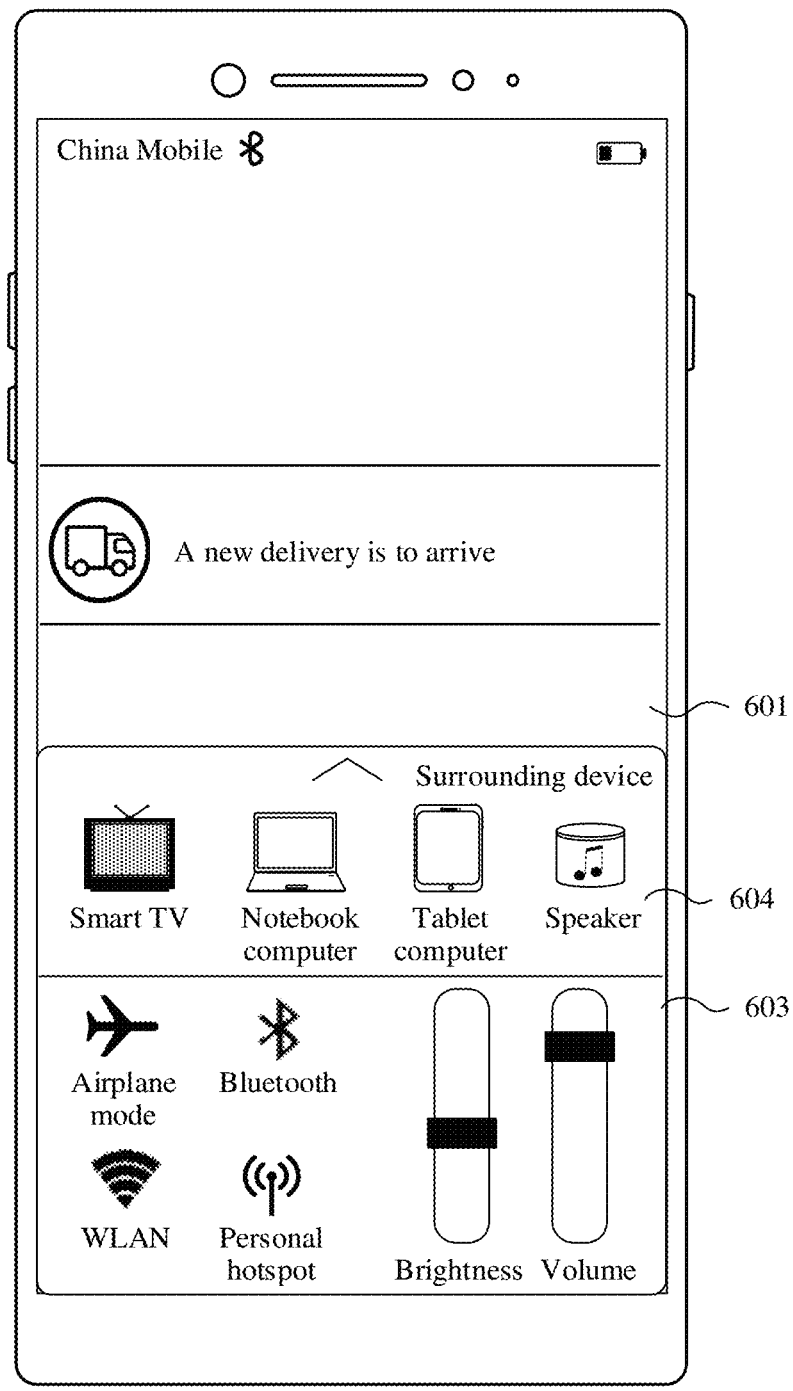

For example, as shown in FIG. 6(*a*), when displaying a lock screen 601, the mobile phone may display a thumbnail icon 602 of the control center on the lock screen 601. For example, the thumbnail icon 602 is displayed at the bottom of the lock screen 601. If it is detected that the user performs a preset operation on the thumbnail icon 602, for example, performs a pull-up operation on the thumbnail icon 602, it indicates that the user needs to open the control center of the mobile phone. In this case, as shown in FIG. 6(*b*), the mobile phone may display a control center 603 on the lock screen 601 in response to the pull-up operation.

Still as shown in FIG. 6(*b*), in the control center 603, the mobile phone may display, in the control center 603, identifiers of N found electronic devices (N is an integer greater than 0) that are located in a same content continuation system 200 as the mobile phone, to form a device list 604. For example, the mobile phone may display, in the control center 603, identifiers of N found electronic devices that are located in a same Wi-Fi network as the mobile phone. Alternatively, the mobile phone may request a server to search for N electronic devices that are currently logged in to by using a same account as the mobile phone, and display identifiers of the N found electronic devices in the control center 603. Certainly, the mobile phone may alternatively display, in the device list 604, identifiers of N electronic devices that access a same Wi-Fi network as the mobile phone and that are logged in to by using a same account as the mobile phone. This is not limited in the embodiments of this application.

Figure 7A:
FIG. 7(a) and FIG. 7(b) are a schematic diagram 4 of an example application scenario of a content continuation method according to an embodiment of this application.
Figure 7B:
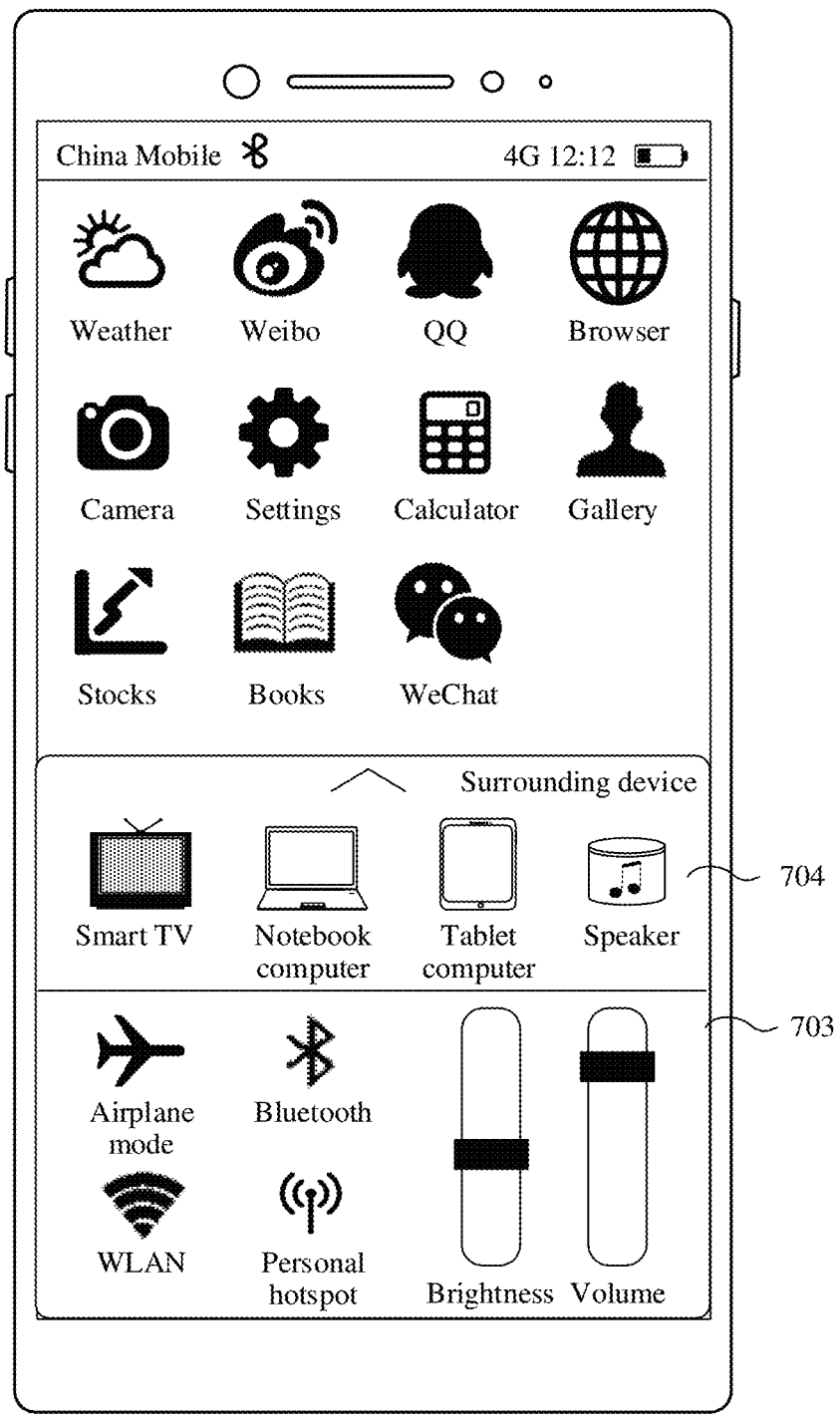

In some embodiments, as shown in FIG. 7(*a*), when displaying a home screen 701, the mobile phone may also display the thumbnail icon 602 on the home screen 701. If it is detected that the user performs a preset pull-up operation on the thumbnail icon 602, as shown in FIG. 7(*b*), the mobile phone may display a control center 703 on the home screen 701 in response to the pull-up operation. Similar to the control center 603, the control center 703 may also include a device list 704 including N electronic devices that can perform content continuation with the mobile phone.

Figure 8A:
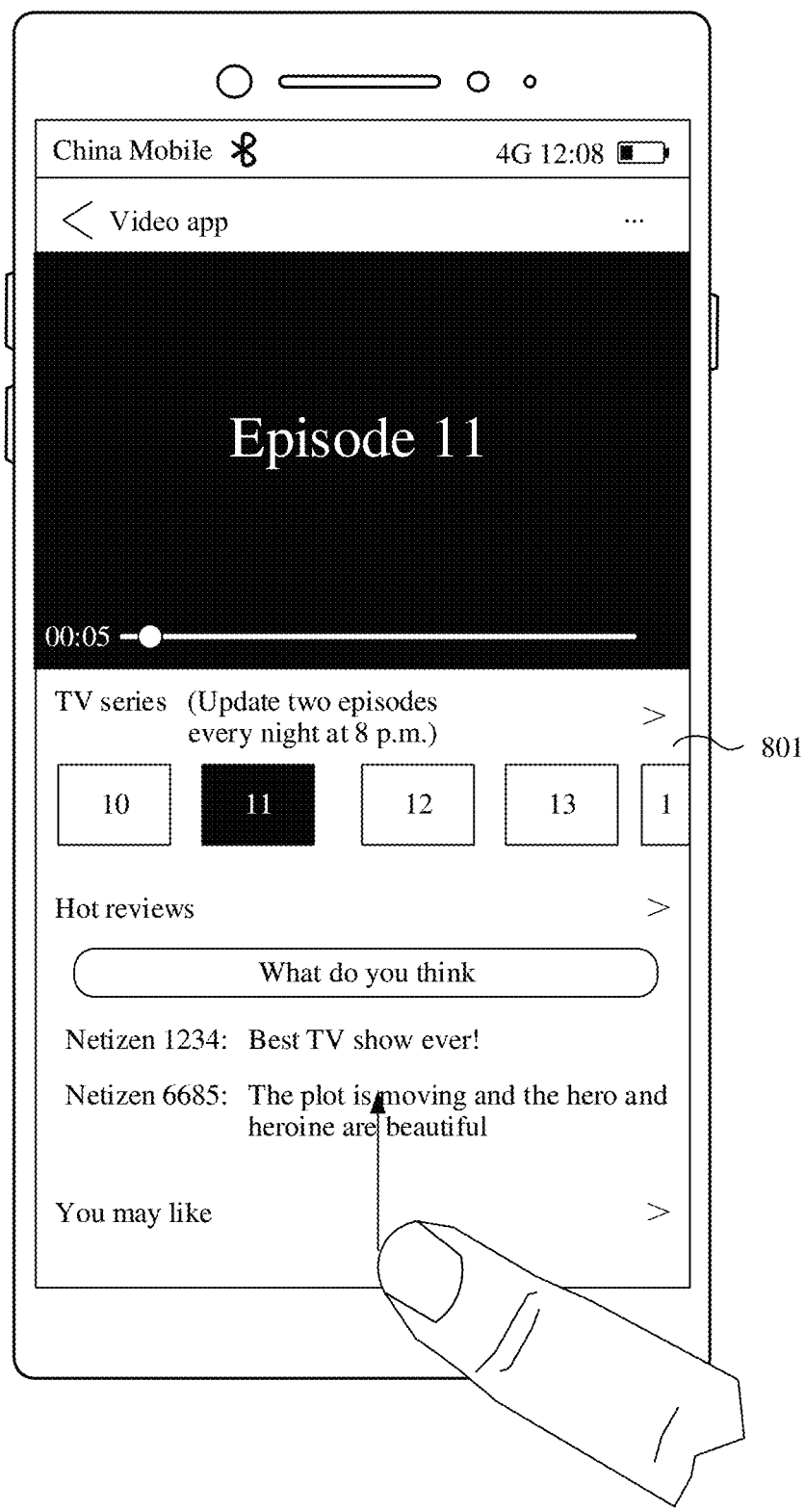
FIG. 8(a) and FIG. 8(b) are a schematic diagram 5 of an example application scenario of a content continuation method according to an embodiment of this application.
Figure 8B:
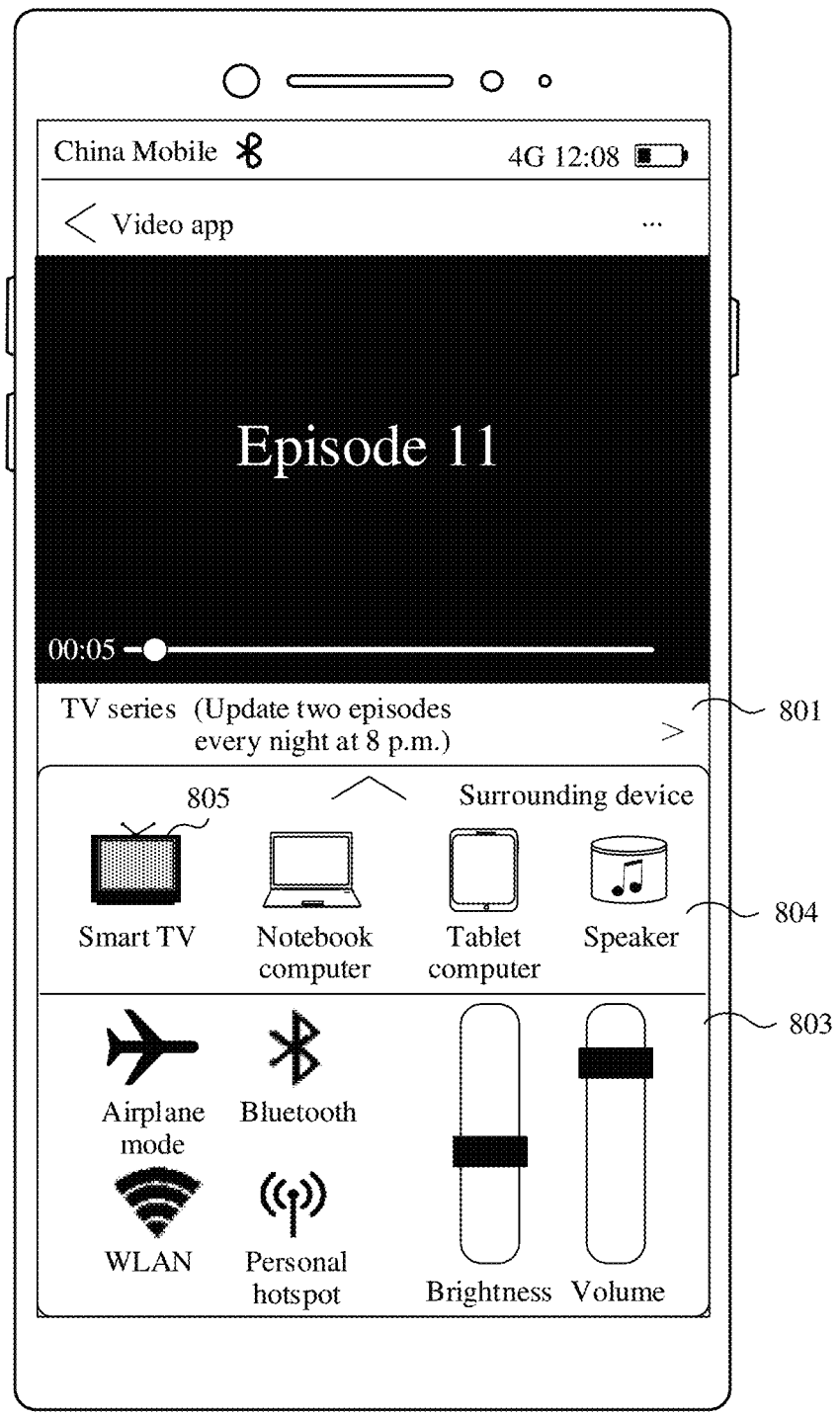

In some embodiments, as shown in FIG. 8(*a*), when the mobile phone displays a play interface 801 of a video app, if it is detected that the user enters a preset operation, for example, a pull-up operation that uses any location at the bottom of the play interface 801 as a start point, as shown in FIG. 8(*b*), the mobile phone may display a control center 803 on the play interface 801 in response to the preset operation. Similar to the control center 603 and the control center 703, the control center 803 includes a device list 804 including N electronic devices that can perform content continuation with the mobile phone. It should be noted that, when displaying the play interface 801 of the video app, the mobile phone may not display the thumbnail icon 602.

S502: The mobile phone receives a selection operation of selecting a first device from the N devices by the user.

The control center 803 shown in FIG. 8(*b*) is still used as an example. After the mobile phone displays the control center 803 on the play interface 801 (that is, the first interface), because the electronic devices in the device list 804 in the control center 803 are all interconnected to the mobile phone in the content continuation system 200, the mobile phone may perform a current content continuation task with any device in the device list 804.

The user may select, from the device list 804, a first device that the user currently wants to use to perform content continuation with the mobile phone. For example, the user may tap an identifier 805 of a smart TV in the device list 804. After the mobile phone detects that the user taps the identifier 805 of the smart TV in the device list 804, it indicates that the user selects the smart TV from the device list 804 as the first device to perform content continuation with the mobile phone. In this case, the mobile phone may continue to perform steps S503 to S506.

S503: In response to the selection operation, the mobile phone determines, based on the first interface, whether the mobile phone is a source device or a target device of the current content continuation task.

An example in which the first interface is the foregoing play interface 801 is still used. After the mobile phone detects that the user selects the identifier 805 of the smart TV from the device list 804, the mobile phone may determine, based on an application type to which the play interface 801 belongs, whether a role played by the mobile phone in the current content continuation task is a source device or a target device.

When the mobile phone is the source device, content (such as one or more of a picture, an animation, a video, a web page, audio, or text) that is being played by the mobile phone needs to be switched to another device for playing. Therefore, it may be preset that, when the mobile phone runs a video call application, a video play application, an office application, a game application, or an audio application, the mobile phone may be used as a source device of a content continuation task. In this case, content played by the mobile phone is more suitable for being continuously played by another device. In this case, after detecting that the user selects the identifier 805 of the smart TV from the device list 804, the mobile phone may determine that the currently displayed play interface 801 is an application interface in the video app, and the video app is a video play application. In this case, the mobile phone may determine that the mobile phone is the source device of the current content continuation task.

Correspondingly, when the mobile phone is the target device, content in another device needs to be switched to the mobile phone for playing. Therefore, when the mobile phone does not run a video call application, a video play application, an office application, a game application, or an audio application, the mobile phone is more suitable for playing content in another device. For example, it may be set that, when the mobile phone runs an application such as a lock screen or a home screen, if it is detected that the user selects an electronic device from the control center to perform content continuation, the mobile phone may determine that the mobile phone is the target device of the current content continuation task.

In some embodiments, in addition to determining, based on the application type to which the first interface belongs, whether the mobile phone is a source device, the mobile phone may further determine, with reference to a device capability of the first device selected by the user, whether the mobile phone is a source device or a target device of the current content continuation task. For example, when the first device is capable of playing content (for example, display content or audio content) on the first interface, the mobile phone may determine that the mobile phone is the source device of the current content continuation task. When the first device is incapable of playing the content on the first interface, the mobile phone may determine that the mobile phone is the target device of the current content continuation task.

Figure 9:
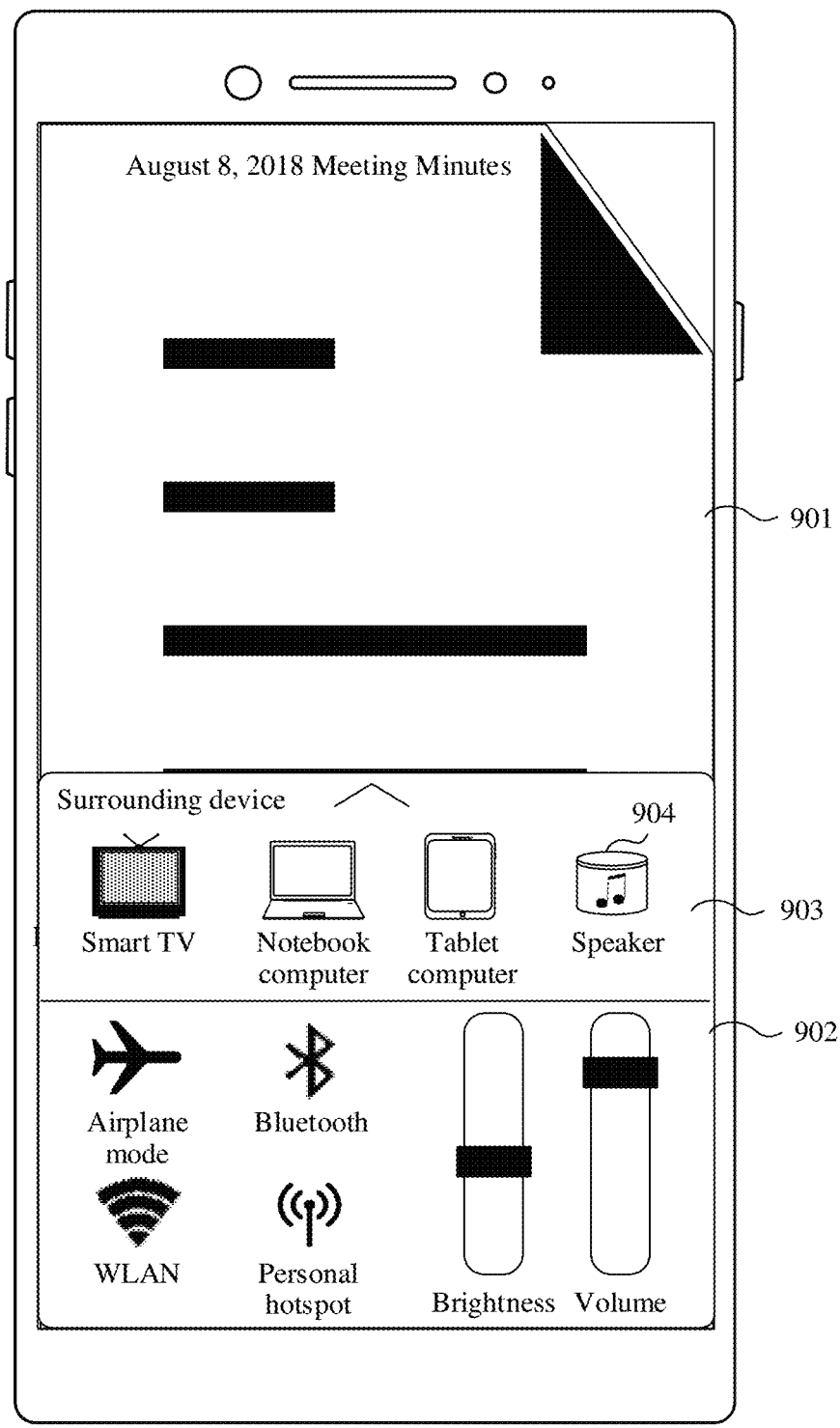
FIG. 9 is a schematic diagram 6 of an example application scenario of a content continuation method according to an embodiment of this application.

For example, as shown in FIG. 9, when displaying a document 901, the mobile phone may open a control center 902 in response to a preset operation entered by the user. If it is detected that the user selects an identifier 904 of a smart speaker from a device list 903 of the control center 902, it indicates that the user wants to use the mobile phone to perform a current content continuation task with the smart speaker. Although a WPS application to which the document 901 being displayed by the mobile phone belongs is an office application, the smart speaker selected by the user does not have a display capability. Therefore, if the mobile phone is used as the source device to perform content continuation of the document 901 with the smart speaker, the smart speaker cannot display the document 901 and cannot complete the current content continuation task. Therefore, after detecting that the user selects the identifier 904 of the smart speaker, the mobile phone may determine that the mobile phone is the target device of the current content continuation task.

S504: If the mobile phone is the source device of the current content continuation task, the mobile phone switches content on the first interface to the first device for continuous playing.

Figure 10A:
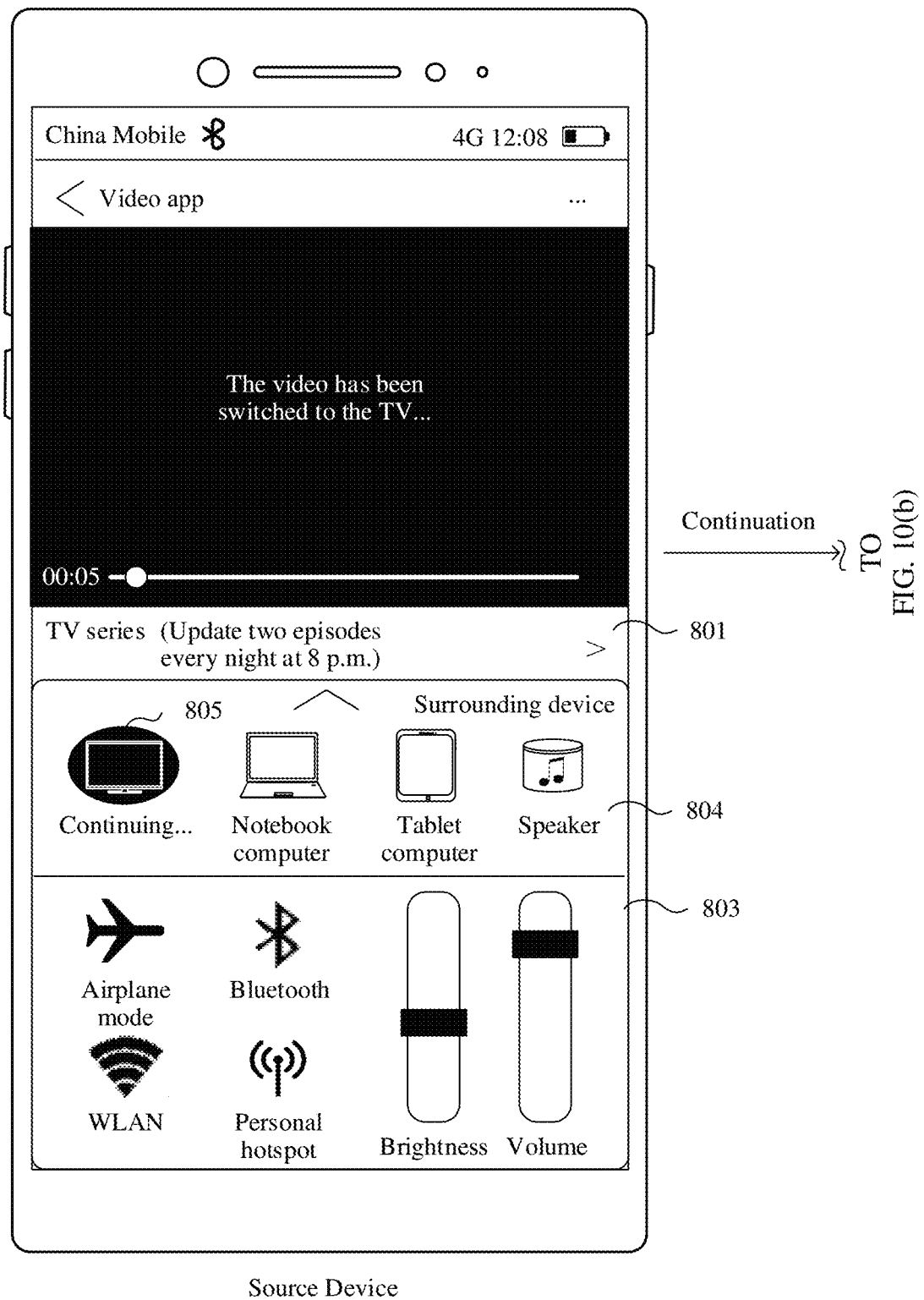
FIG. 10(a) and FIG. 10(b) are a schematic diagram 7 of an example application scenario of a content continuation method according to an embodiment of this application.
Figure 10B:
Figure 11A:
FIG. 11(a) to FIG. 11(d) are a schematic diagram 8 of an example application scenario of a content continuation method according to an embodiment of this application.
Figure 11B:
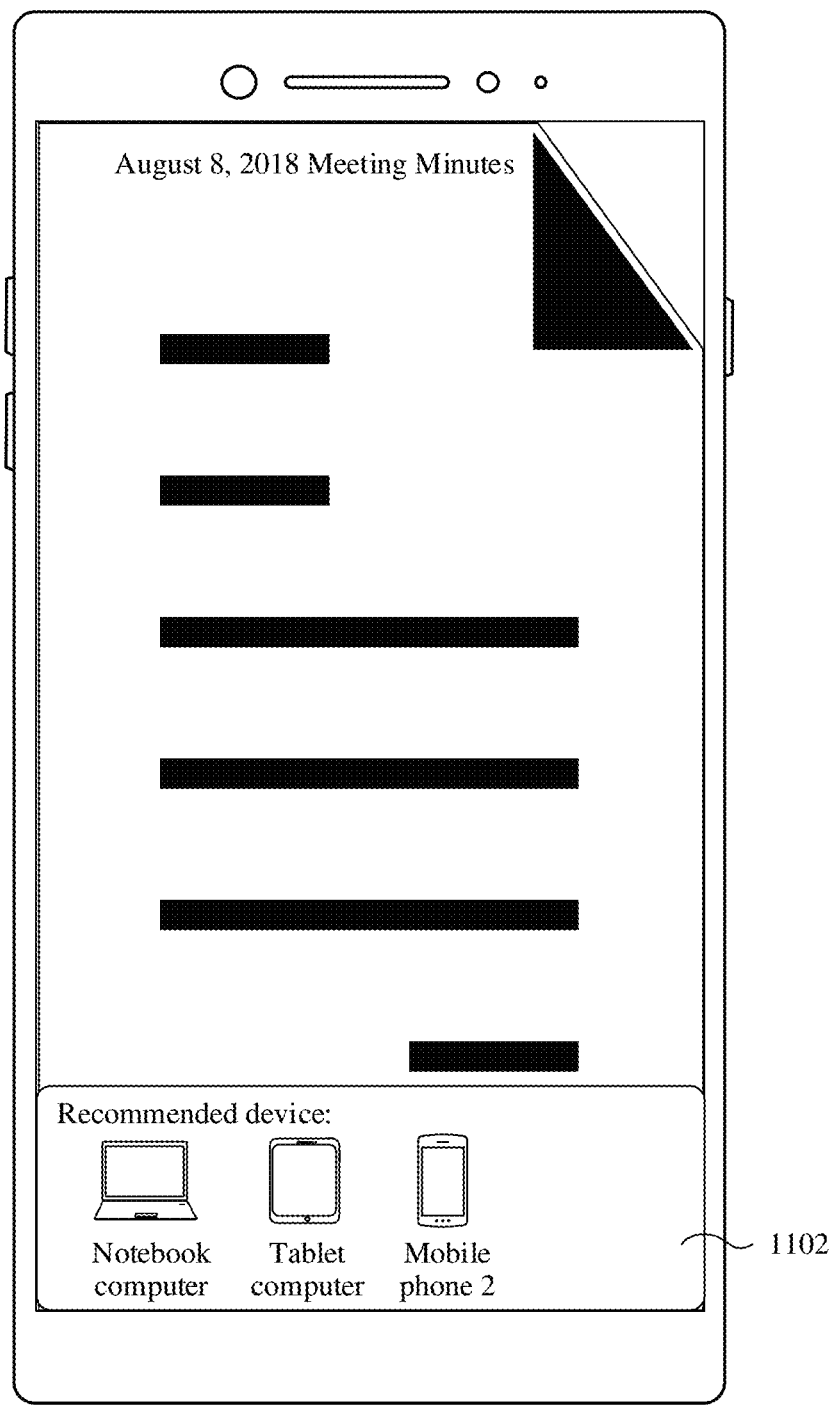
Figure 11C:
Figure 11D:
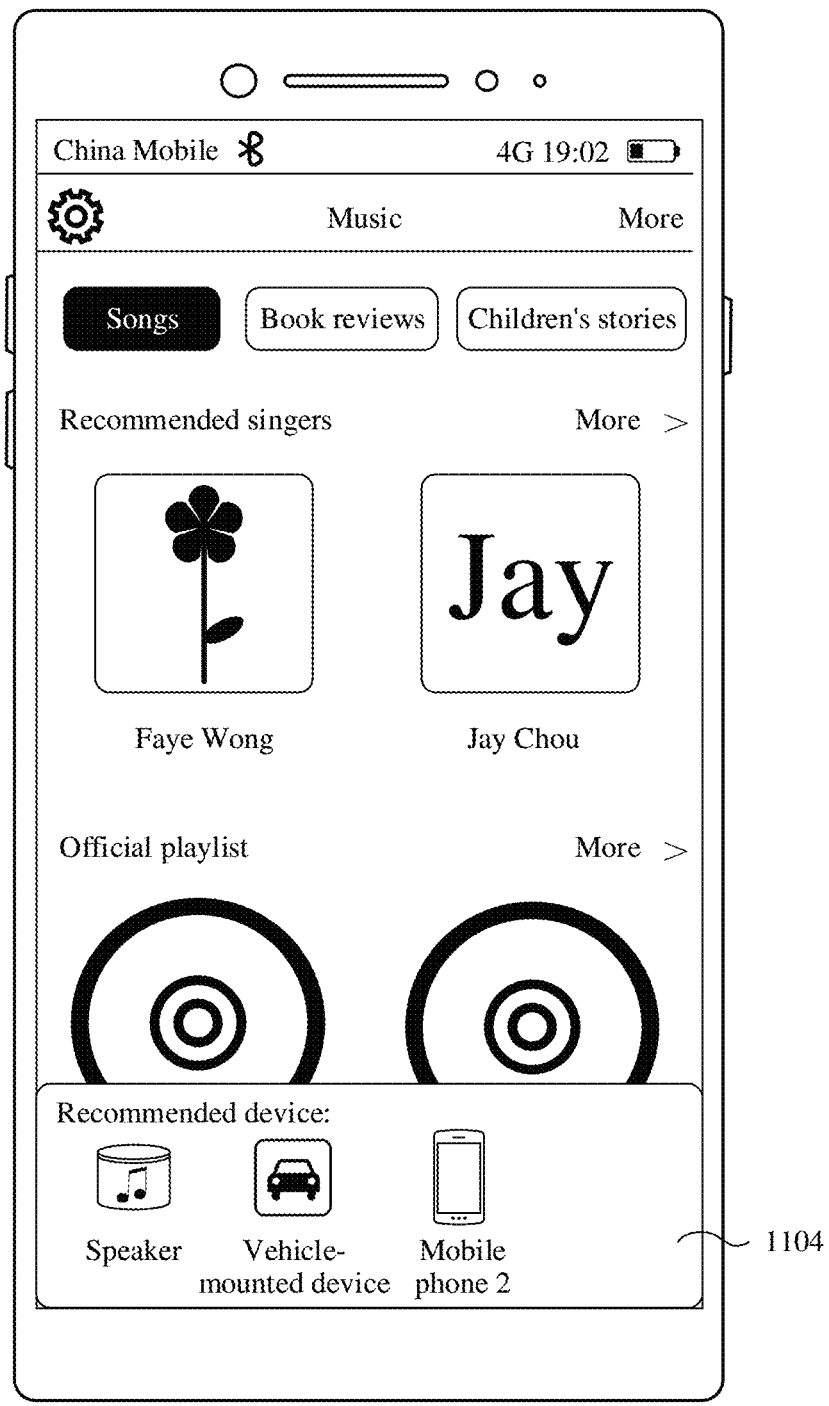

An example in which the first interface is the foregoing play interface 801 is still used. Because the video app to which the play interface 801 belongs is a video play application, the mobile phone may determine that the mobile phone is the source device of the current content continuation task. In this case, as shown in FIG. 10(*a*), the mobile phone used as the source device may use a smart TV (that is, the first device) selected by the user as the target device, to indicate the smart TV to start playing content on the interface 801, for example, display content and audio content on the interface 801. As shown in FIG. 10(*b*), the smart TV may be used as the target device of the mobile phone to start continuously playing the content on the play interface 801, to complete the current content continuation task.

For example, when the mobile phone is used as the source device to perform content continuation with the smart TV, the mobile phone may indicate, through DLNA (digital living network alliance) screen projection, the smart TV to open a video APP installed in the smart TV to play same content as the mobile phone. In this case, after the user operates the mobile phone to leave the play interface 801, the smart TV can still continuously play the video on the play interface 801, and the user may operate another application in the mobile phone.

Still as shown in FIG. 10(*a*), after the mobile phone switches the currently played content to the smart TV for playing, the mobile phone may mark the smart TV as a continuation device of the current mobile phone in the device list 804 of the control center 803. For example, the mobile phone may highlight the identifier 805 of the smart TV in the device list 804, to prompt the user that the content on the play interface 801 has been switched to the smart TV for continuous playing. In addition, after the mobile phone switches the play interface 801 to the smart TV for continuous playing, the mobile phone may continue to display the play interface 801, or may exit the play interface 801. This is not limited in the embodiments of this application.

In some embodiments, when the mobile phone runs a related application that can be a source device of the content continuation task, for example, when the mobile phone runs a video call application, a video play application, an office application, a game application, or an audio application, the mobile phone may alternatively actively search the content continuation system 200 for N electronic devices that can be used as a target device of the mobile phone to perform content continuation, and push the N electronic devices to the user for selection in a push message.

For example, as shown in FIG. 11(*a*), when running a video call application or a video play application, the mobile phone may display a push message 1101. The push message 1101 includes identifiers of one or more electronic devices that can perform content continuation with the mobile phone. For example, when displaying the push message 1101, the mobile phone may preferentially display a large-screen device that is suitable for running a video call application or a video play application, for example, a smart TV, a notebook computer, or a tablet computer.

Similarly, as shown in FIG. 11(*b*), when running an office application, the mobile phone may display a push message 1102. The push message 1102 includes identifiers of one or more electronic devices that can perform content continuation with the mobile phone. For example, when displaying the push message 1102, the mobile phone may preferentially display an office device that is suitable for office, for example, a notebook computer, a desktop computer, or a tablet computer.

Similarly, as shown in FIG. 11(*c*), when running a game application, the mobile phone may display a push message 1103. The push message 1103 includes identifiers of one or more electronic devices that can perform content continuation with the mobile phone. For example, when displaying the push message 1103, the mobile phone may preferentially display a display device that has a display function and that is suitable for running a game application, for example, a mobile phone or a tablet computer.

Similarly, as shown in FIG. 11(*d*), when running an audio application, the mobile phone may display a push message 1104. The push message 1104 includes identifiers of one or more electronic devices that can perform content continuation with the mobile phone. For example, when displaying the push message 1104, the mobile phone may preferentially display an audio output device that is suitable for playing audio, for example, a smart speaker or a vehicle-mounted device.

Certainly, when displaying the control center (for example, the control center 803) on the first interface, the mobile phone may alternatively sort the electronic devices in the device list of the control center based on the type of the application to which the first interface belongs, and preferentially recommend, to the user, an electronic device suitable for continuously playing the first interface.

Figure 12A:
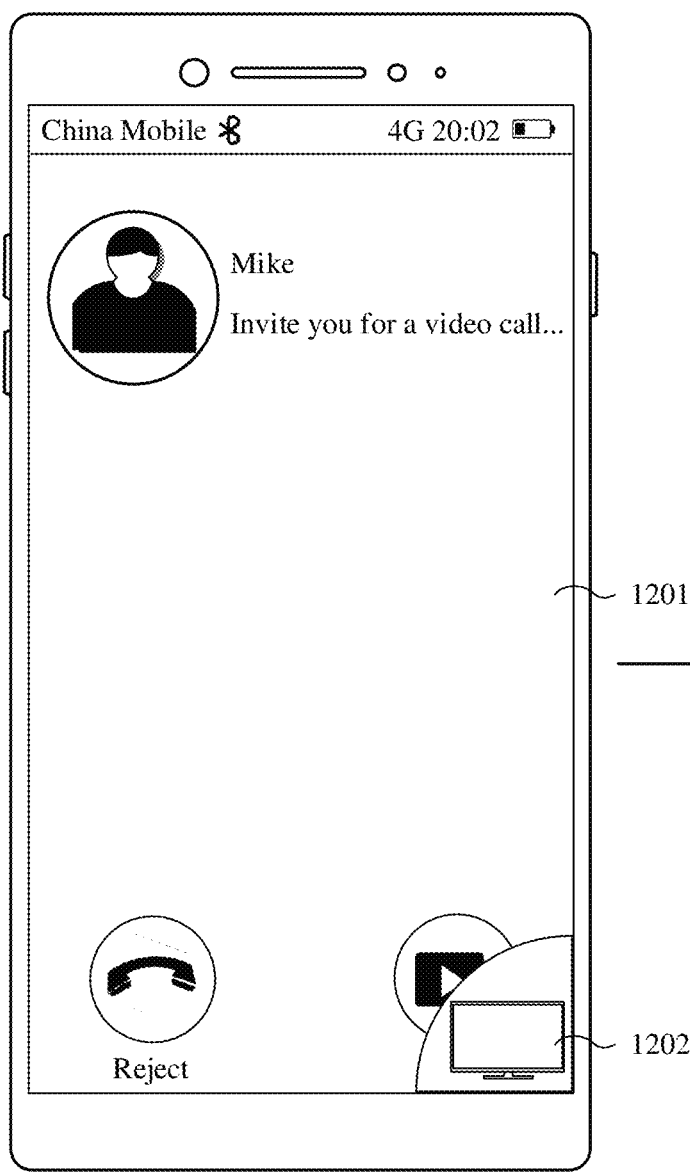
FIG. 12(a) to FIG. 12(c) are a schematic diagram 9 of an example application scenario of a content continuation method according to an embodiment of this application.
Figure 12B:
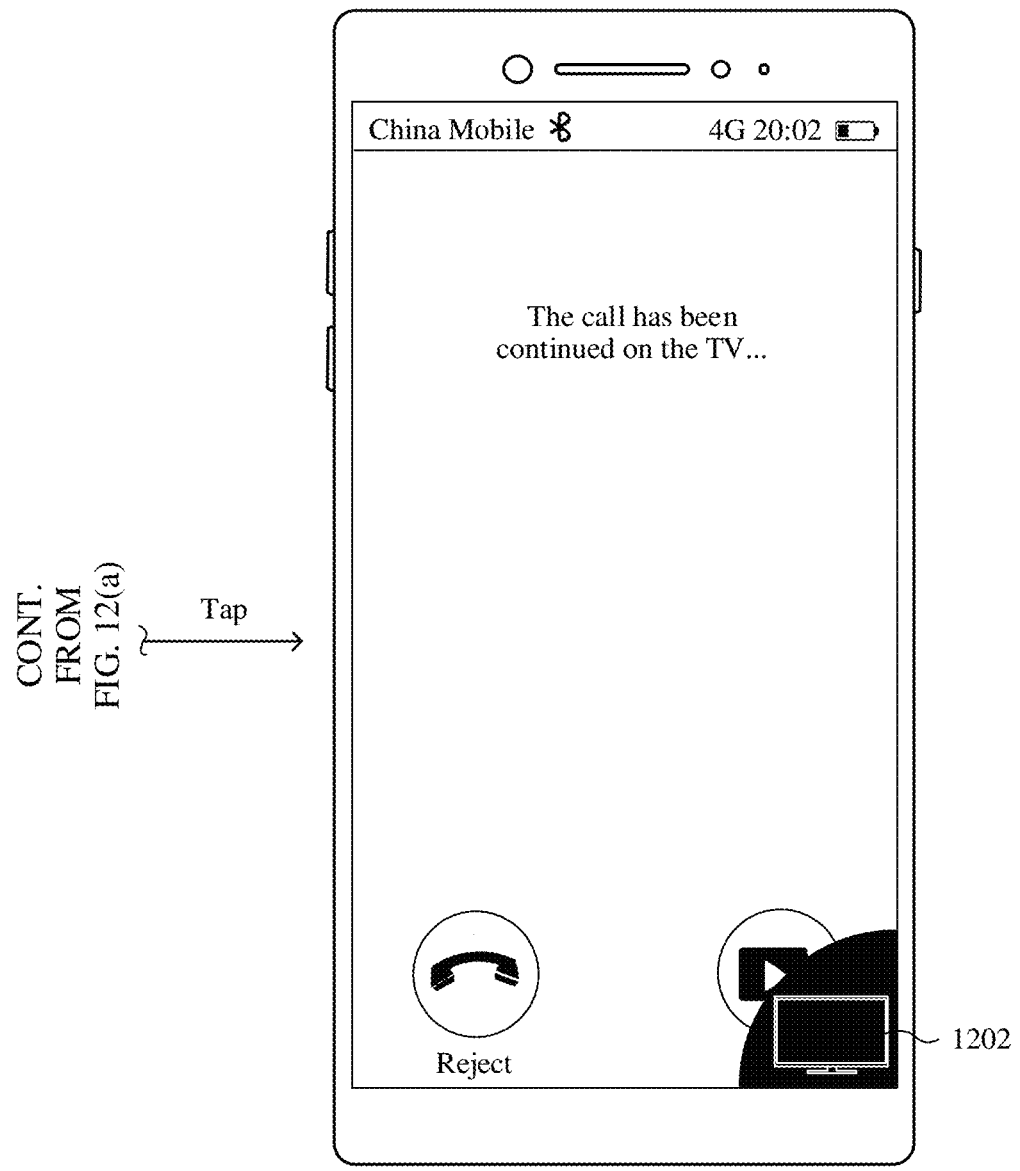
Figure 12C:
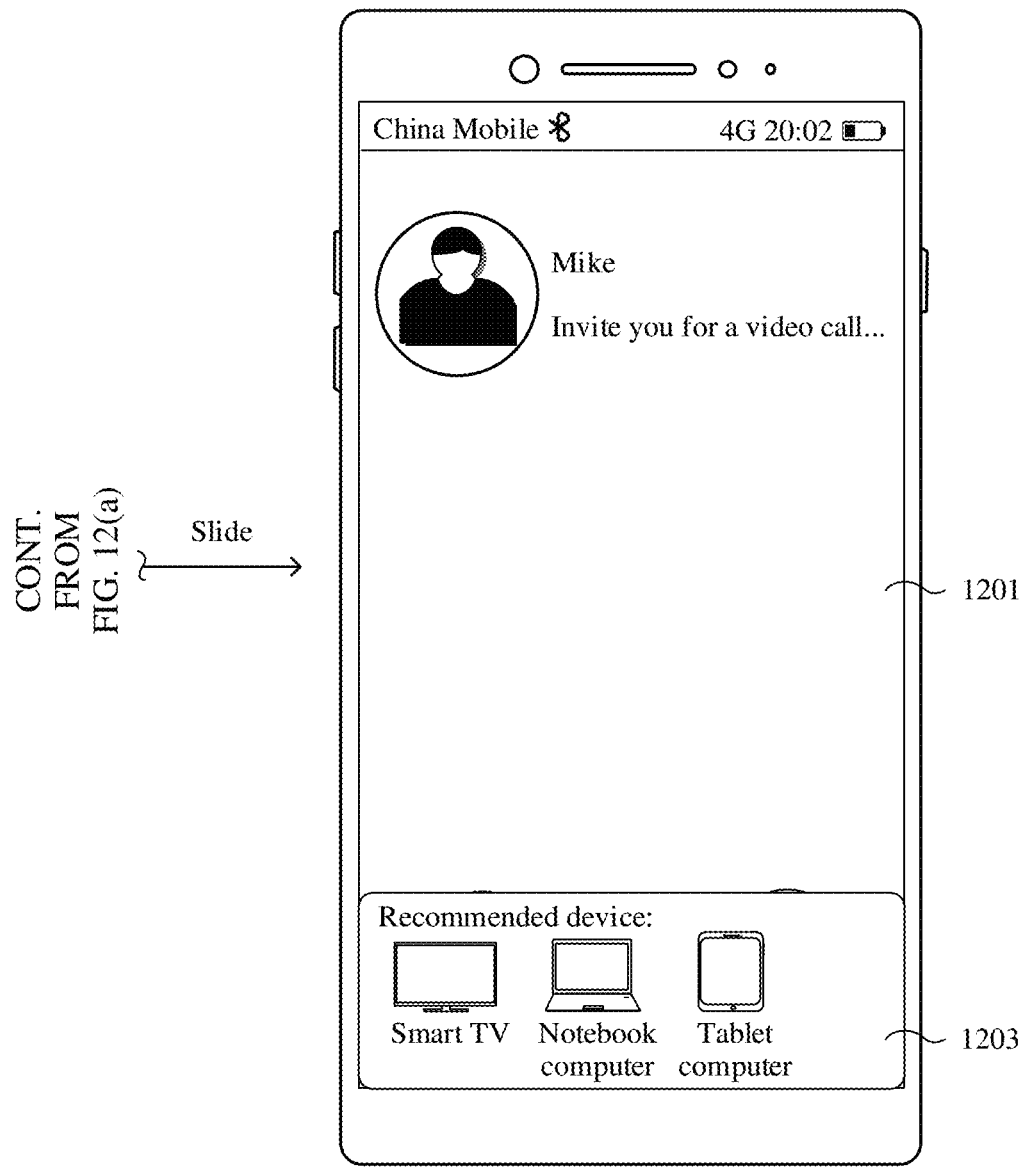

In some embodiments, as shown in FIG. 12(*a*), when running a video call application, the mobile phone may display a video call interface 1201. In this case, if the mobile phone finds a plurality of electronic devices that are in the content continuation system 200 and that can continuously play the video call interface 1201, the mobile phone may push an identifier 1202 of a smart TV with a highest priority in the plurality of electronic devices to the user. If it is detected that the user enters a tap operation for the identifier 1202, it indicates that the user wants to switch the video call interface 1201 in the mobile phone to the smart TV for continuous playing. In this case, as shown in FIG. 12(*b*), when the mobile phone switches the video call interface 1201 to the smart TV for continuous playing, the mobile phone may highlight the identifier 1202 of the smart TV, to prompt the user that a current continuation device of the mobile phone is the smart TV. If the mobile phone does not detect, within a preset time after displaying the identifier 1202, any operation entered by the user for the identifier 1202, it indicates that the user does not need to continuously play the video call interface 1201 in another device. In this case, the mobile phone may hide the identifier 1202 of the smart TV on the video call interface 1201.

For another example, after the mobile phone displays the identifier 1202 of the smart TV on the video call interface 1201, if the user wants to view more electronic devices that can continuously play the video call interface 1201 in addition to the smart TV, the user may enter a preset operation for the identifier 1202, for example, a slide operation on the screen. In this case, as shown in FIG. 12(*c*), in response to the slide operation entered by the user, the mobile phone may display a complete push message 1203 on the video call interface 1201. The push message 1203 includes identifiers of one or more electronic devices that are currently found by the mobile phone in the content continuation system 200 and that can perform content continuation. Similarly, if the mobile phone does not detect, within a preset time, any operation entered by the user for the push message 1203, the mobile phone may hide the push message 1203 on the video call interface 1201. In addition, if it is detected that the user continues to slide the push message 1203 to the top of the video call interface 1201, the mobile phone may display a complete control center on the video call interface 1201.

In some other embodiments, the user may alternatively enter a preset trigger gesture for a preset application such as a video call application, a video play application, an office application, a game application, or an audio application, to trigger the mobile phone to push, to an application selected by the user, one or more electronic devices that perform content continuation.

Figure 13A:
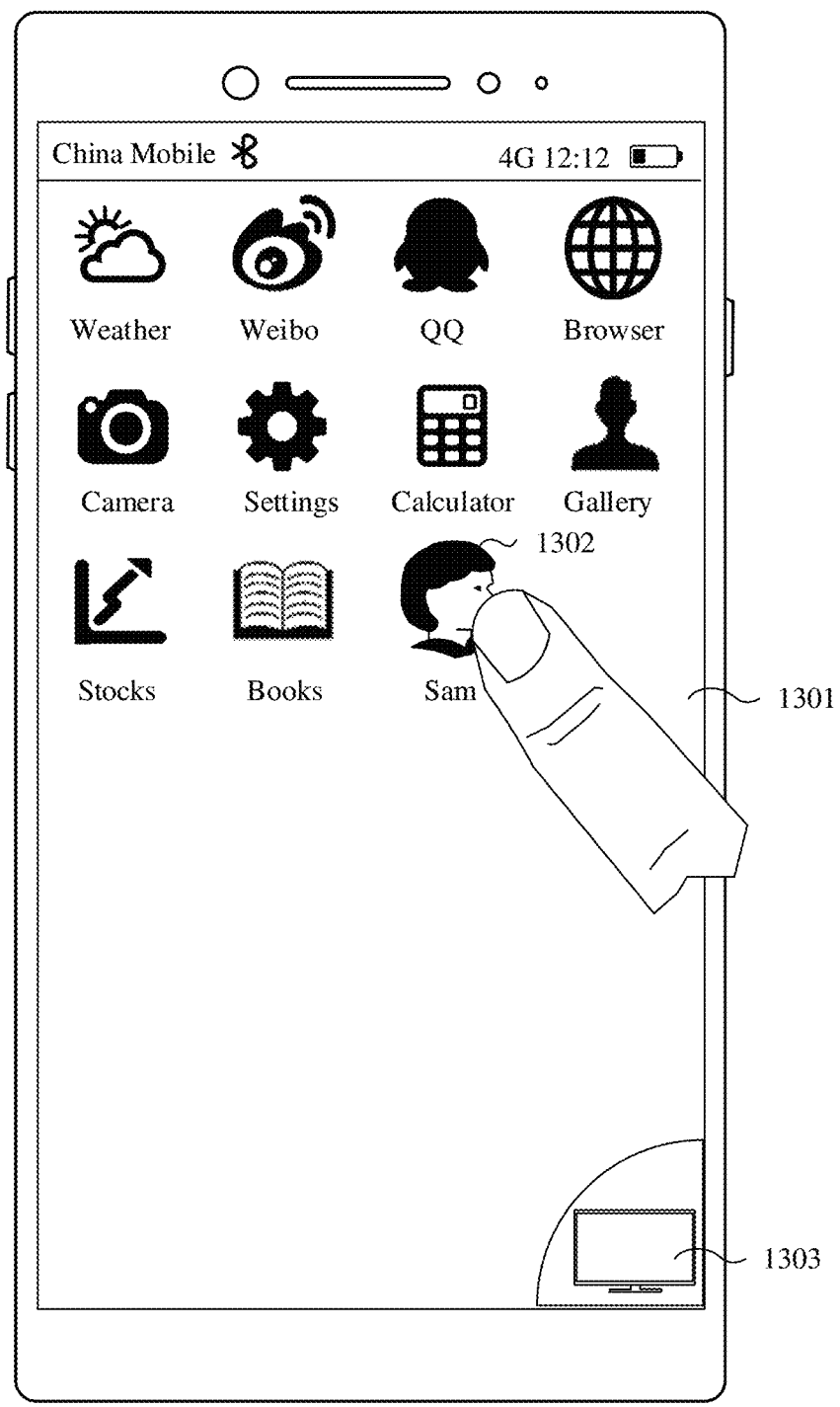
FIG. 13(a) to FIG. 13(c) are a schematic diagram 10 of an example application scenario of a content continuation method according to an embodiment of this application.
Figure 13B:
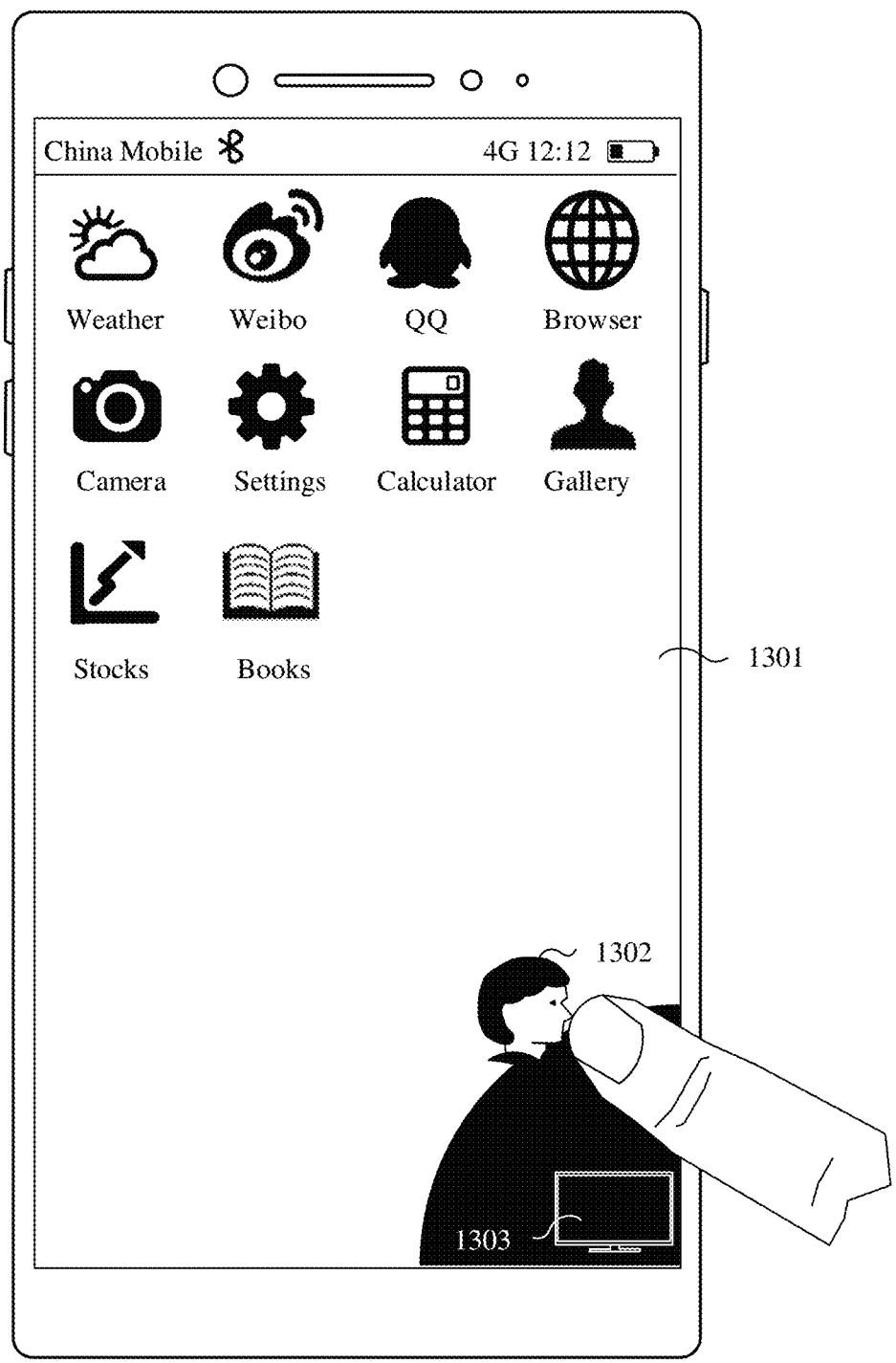
Figure 13C:
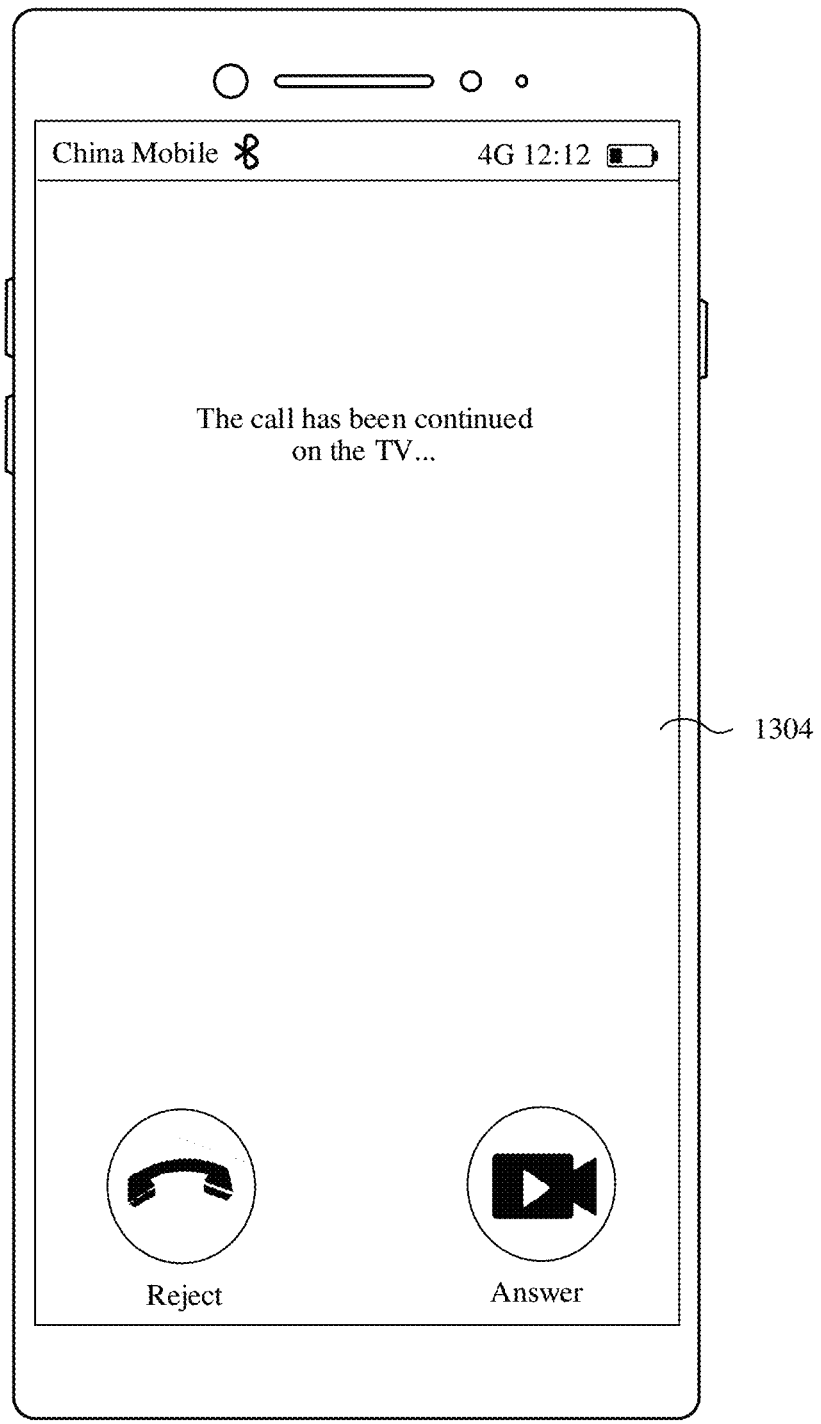

For example, as shown in FIG. 13(*a*), the mobile phone may display a shortcut 1302 of a contact Sam in a video call application on a home screen 1301. If it is detected that the user enters a preset trigger gesture for the shortcut 1302, for example, a touch and hold gesture, the mobile phone may push, to the user, identifiers of one or more electronic devices that are in the content continuation system 200 and that currently support a video call. For example, as shown in FIG. 13(*a*) or FIG. 13(*b*), the mobile phone may display an identifier 1303 of a smart TV. If it is detected that the user continues to drag the shortcut 1302 to an area in which the identifier 1303 of the smart TV is located and then let go, it indicates that the user wants to switch content of a video call with the contact Sam to the smart TV. In this case, the mobile phone may open the video call app in the mobile phone to send a video call request to the contact Sam, and switch the video call app that is being run to the smart TV for continuous playing. Alternatively, the mobile phone may create a task of a video call with the contact Sam, and send the task to the smart TV, to trigger the smart TV to open the installed video call app to make a video call with the contact Sam. In this case, the mobile phone may switch content of the video call with the contact Sam to the smart TV without running the video call app. After the mobile phone switches the content of the video call with the contact Sam to the smart TV, as shown in FIG. 13(*c*), the mobile phone may prompt, on an interface 1304, the user that the content of the video call with the contact Sam has been switched to the smart TV for continuous playing.

Figure 14A:
FIG. 14(a) and FIG. 14(b) are a schematic diagram 11 of an example application scenario of a content continuation method according to an embodiment of this application.
Figure 14B:
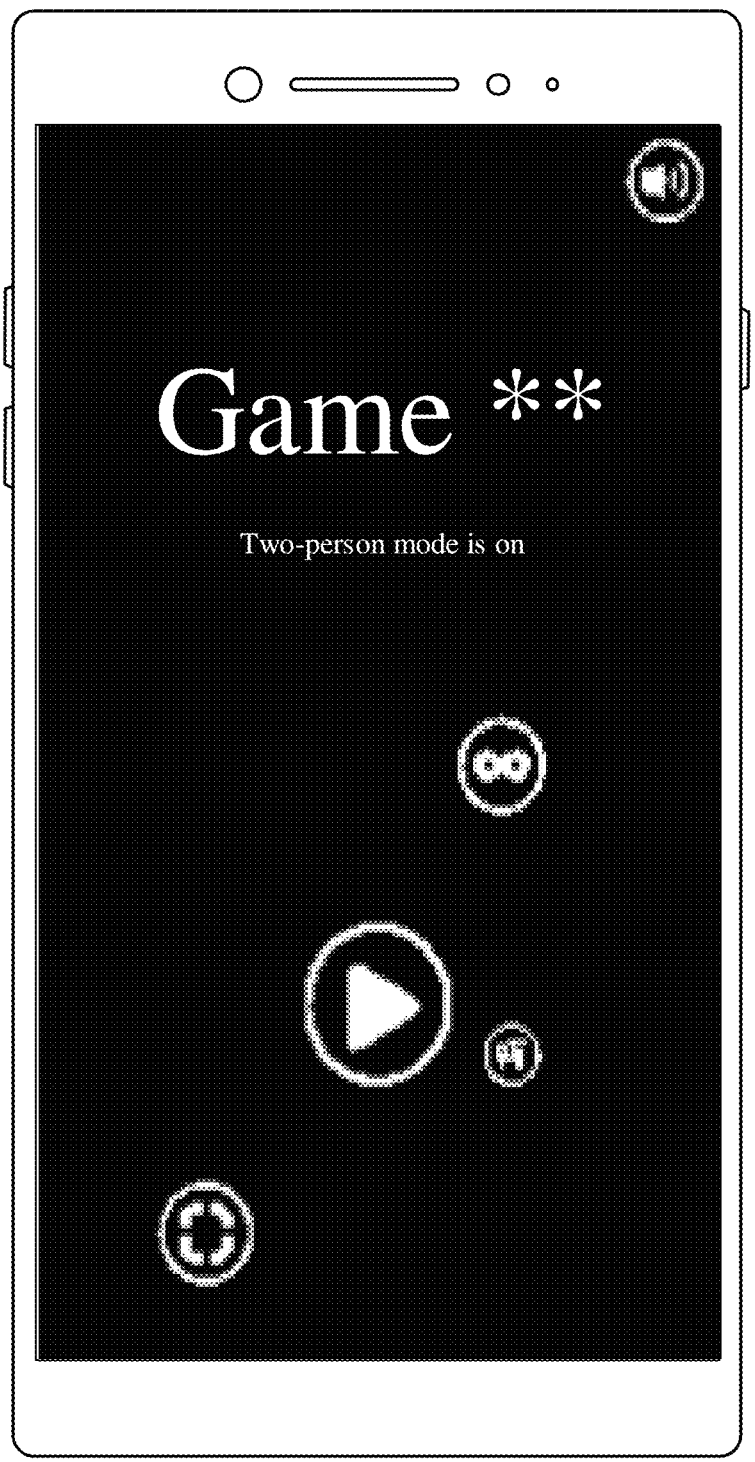

In some other embodiments, after the mobile phone switches the content of the video call with the contact Sam to the smart TV for continuous playing, the mobile phone may further continue to run another application. For example, as shown in FIG. 14(*a*), the mobile phone may display an interface 1401 of a game app in response to an operation of opening the game app by the user. Because the mobile phone may be used as a source device to switch the interface 1401 to another electronic device for continuous playing, the mobile phone may display a push message 1402 on the interface 1401. The push message 1402 includes identifiers of one or more electronic devices that are in the content continuation system 200 and that can currently continuously play the interface 1401. If it is detected that the user selects an identifier of a tablet computer in the push message 1402, it indicates that the user also wants to run the interface 1401 of the game app in the tablet computer. In this case, if the game app supports a two-person operation mode, as shown in FIG. 14(*b*), the mobile phone may automatically enter the two-person operation mode of the game app, and switch the game app that enters the two-person operation mode to the tablet computer for continuous running. In this way, after the mobile phone switches the game app to the tablet computer for continuous running, two users can respectively use the mobile phone and the tablet computer to jointly operate the game app.

Certainly, after detecting that the user selects the identifier of the tablet computer in the push message 1402, the mobile phone may alternatively not enter the two-person operation mode of the game app, but prompts the user that the game app has been switched to the tablet computer for continuous running. This is not limited in the embodiments of this application.

Figure 15A:
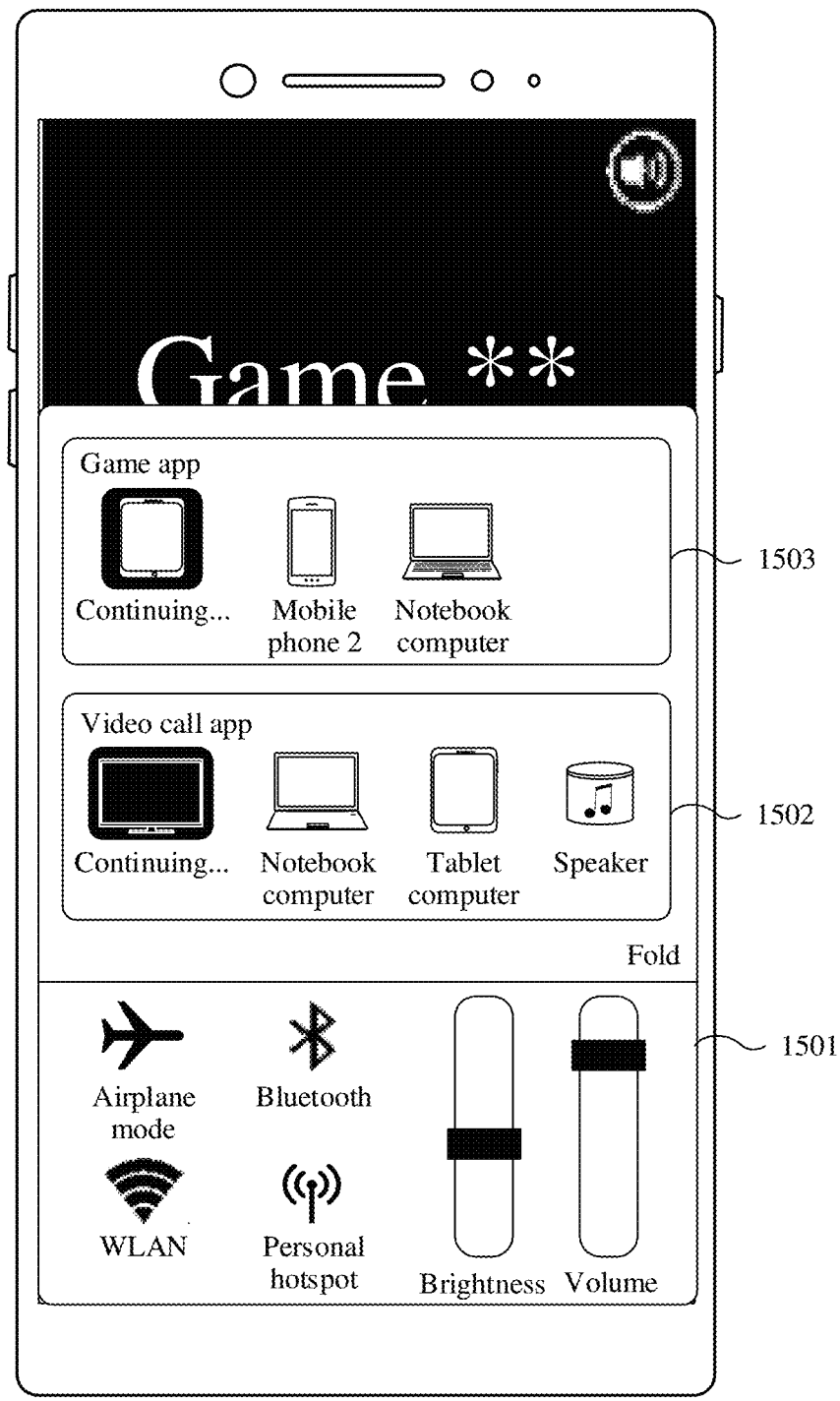
FIG. 15(a) and FIG. 15(b) are a schematic diagram 12 of an example application scenario of a content continuation method according to an embodiment of this application.
Figure 15B:
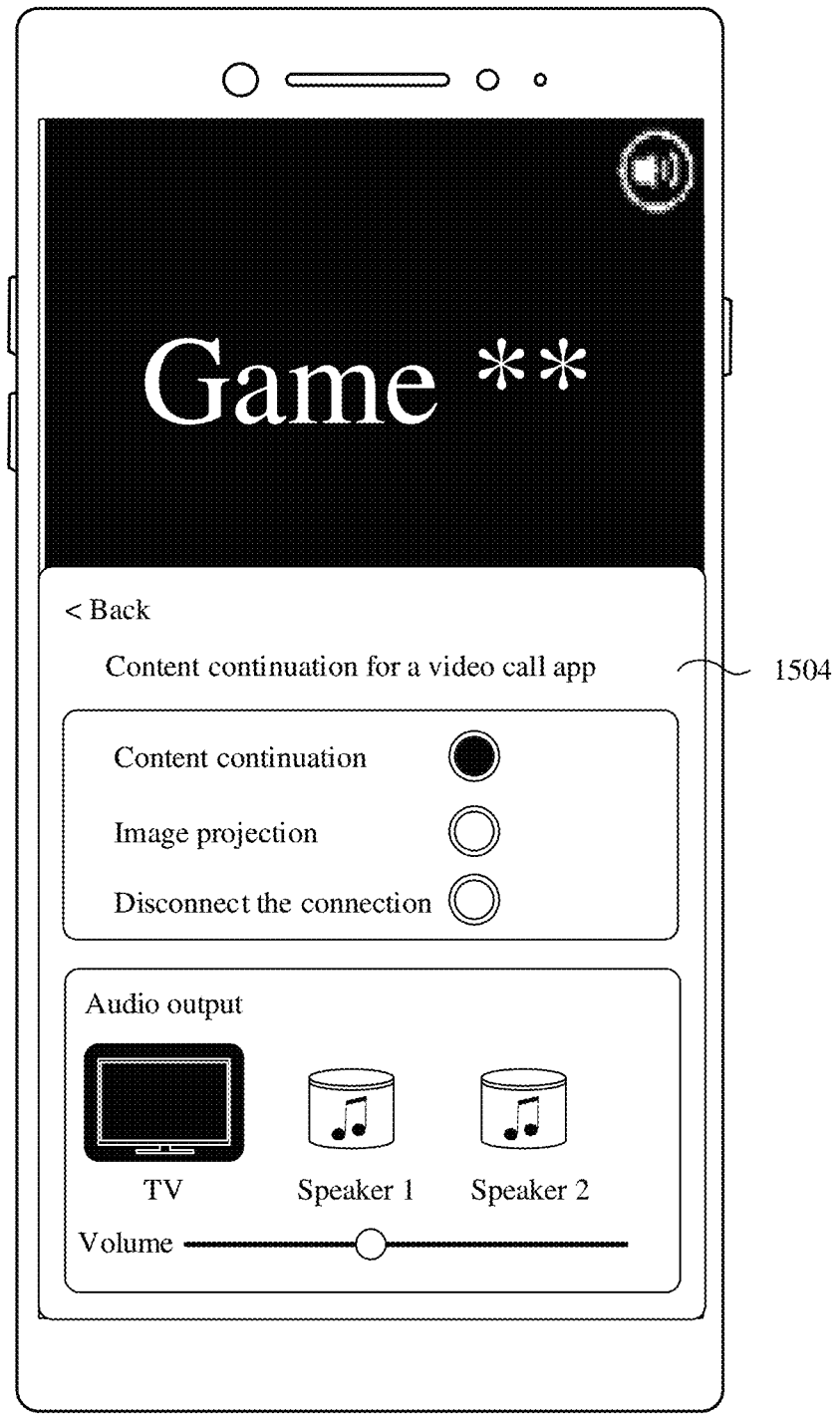

It can be learned that, when the mobile phone is used as a source device of a content continuation task, content in a plurality of applications may be switched to a corresponding electronic device for continuous playing by using an application as a granularity. An example in which the mobile phone switches the video call app to the smart TV for continuous playing, and switches the game app to the tablet computer for continuous playing is still used. In this case, as shown in FIG. 15(*a*), when the user opens a control center 1501 of the mobile phone, the mobile phone may display, in the control center 1501 by using a plurality of cards, device lists corresponding to all content continuation tasks. For example, the mobile phone may display, in a card 1502, a device list corresponding to a content continuation task performed for a video call app. The video call app has been switched to a smart TV in the device list for continuous playing. For another example, the mobile phone may display, in a card 1503, a device list corresponding to a content continuation task performed for a game app. The game app has been switched to a tablet computer in the device list for continuous playing. If the user wants to modify a target device that performs content continuation for the video call app or the game app, the user may tap an electronic device in a corresponding card. The mobile phone may switch, in response to the electronic device selected by the user in the card, the video call app or the game app that is being continued to another electronic device for continuous playing. The plurality of cards displayed in the control center 1501 may be in a folded state or an unfolded state. This is not limited in the embodiments of this application.

In addition, if it is detected that the user performs a preset operation on a card in the control center 1501, for example, an operation of touching and holding the card 1502, as shown in FIG. 15(*b*), the mobile phone may enter a details interface 1504 of a corresponding content continuation task. On the details interface 1504, the user may manually set a related parameter used when the video call app is switched to the smart TV for continuous playing.

For example, the user may disconnect a communication connection between the mobile phone and the smart TV on the details interface 1504, and end a current content continuation task. For another example, the user may modify the current content continuation task to an image projection task on the details interface 1504. After the content continuation task is modified to the image projection task, the mobile phone may send, to the smart TV, each frame of image displayed in real time, so that the smart TV and the mobile phone synchronously display a display picture of the mobile phone. In this case, if the mobile phone exits the video call app, the smart TV may also exit the video call app synchronously and continue to synchronously display a same display picture as the mobile phone. For another example, the user may modify, on the details interface 1504, an audio output device of the current content continuation task, and modify a device that is performing audio output from a smart TV to another device that has an audio output function in the content continuation system. In this case, the smart TV can still display content in the current content continuation task. Certainly, the user may further modify, on the details interface 1504, a display output device of the current content continuation task, or set, on the details interface 1504, a parameter related to the current content continuation task, for example, volume, display brightness, and play progress. This is not limited in the embodiments of this application.

S505: If the mobile phone is the target device of the current content continuation task, the mobile phone displays, in the control center, an application list in the first device.

Corresponding to step S504, if the mobile phone is the target device of the current content continuation task, it indicates that the first interface currently displayed by the mobile phone is not suitable for being continuously played by another device. In this case, the mobile phone used as the target device may use the first device selected by the user as a source device, and switch content in the first device to the mobile phone for playing.

Figure 16A:
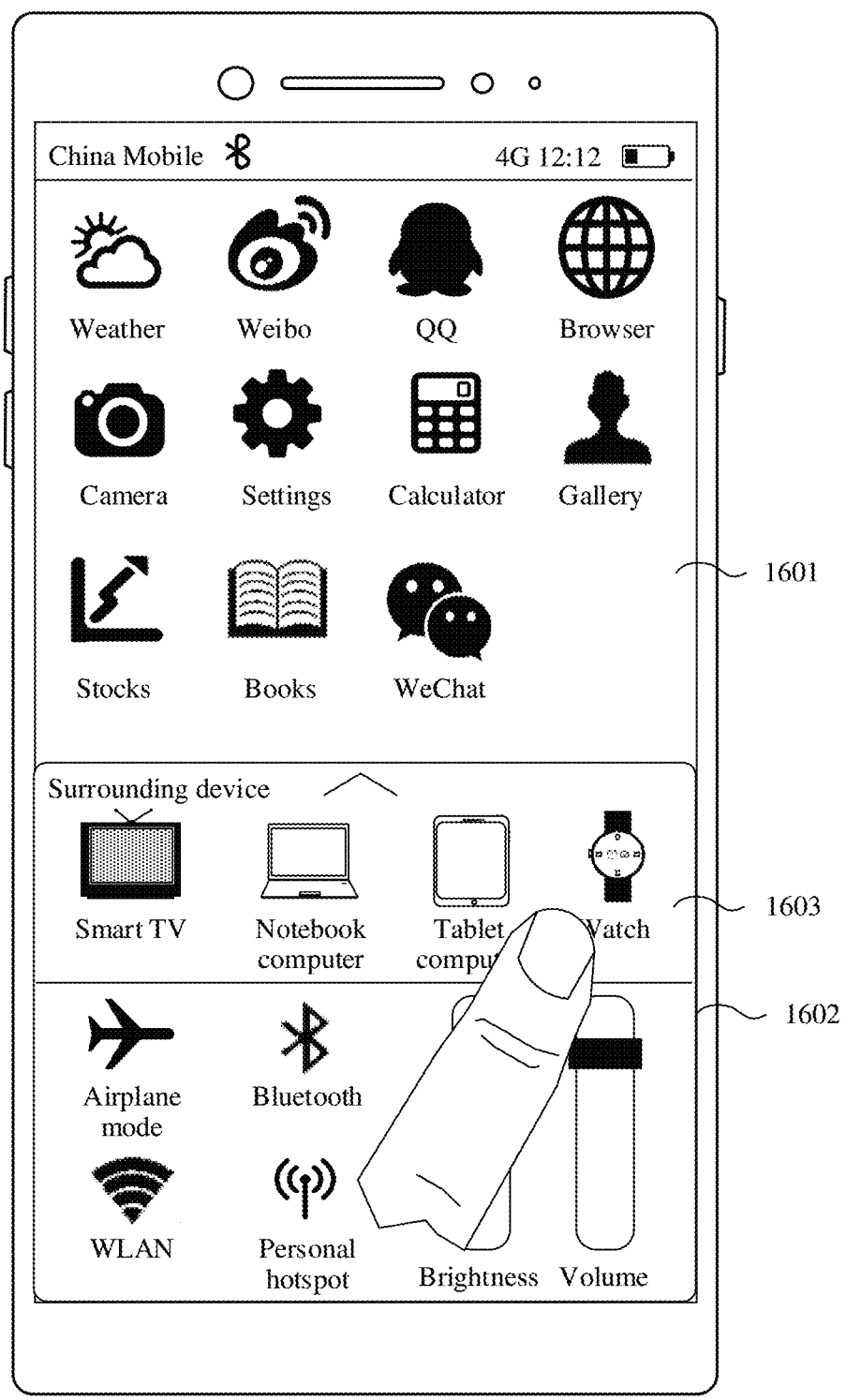
FIG. 16(a) and FIG. 16(b) are a schematic diagram 13 of an example application scenario of a content continuation method according to an embodiment of this application.
Figure 16B:
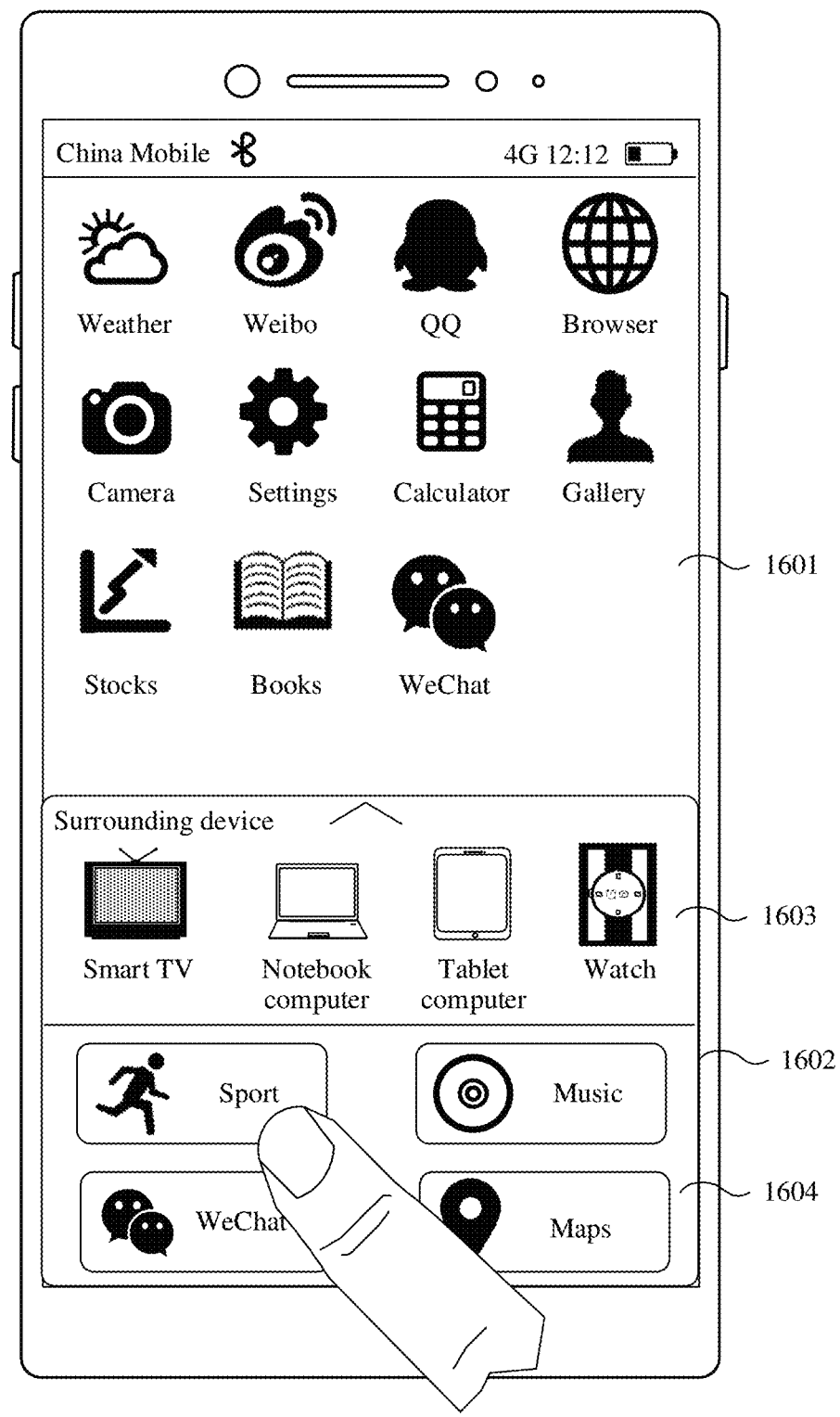

For example, as shown in FIG. 16(*a*), when displaying a home screen 1601, the mobile phone may display a control center 1602. If the user selects an identifier of a smartwatch from a device list 1603 of the control center 1602, it indicates that the user wants to use the mobile phone to perform a current content continuation task with the smartwatch. Because the home screen 1601 is not a preset video call application, video play application, office application, game application, or audio application, the mobile phone may determine that a target device of the current content continuation task is the mobile phone, and a source device of the current content continuation task is the smartwatch.

In this case, as shown in FIG. 16(*b*), the mobile phone may display, in the control center 1602, one or more applications that are being run on the smartwatch (that is, the first device), that is, an application list 1604. For example, when the mobile phone is the target device of the current content continuation task, the mobile phone may search a server for one or more applications that are being run on the smartwatch in the content continuation system 200, and display, in the control center 1602 in a form of the application list 1604, the one or more applications that are being run on the smartwatch. For another example, when the mobile phone is the target device of the current content continuation task, the mobile phone may send a query request to the smartwatch over an accessed Wi-Fi network, to search for one or more applications that are being run on the smartwatch. After receiving a query result sent by the smartwatch in response to the query request, the mobile phone may display one or more applications in the query result in the control center 1602 in a form of the application list 1604.

In this way, when the mobile phone is the target device of the content continuation task, the mobile phone may present, in the control center 1602 to the user, an application that is being run on the first device (that is, the source device). Further, the user may select, from the control center 1602, a specific application in the first device (that is, the source device) that is to be switched to the mobile phone (that is, the target device) for continuous running That is, by operating the control center of the target device, the user may quickly and conveniently switch content in the source device to the target device for continuous playing.

Certainly, in addition to displaying, in the control center 1602, one or more applications that are being run on the first device, the mobile phone may further display an application list including all applications installed in the first device. The user may select, from the control center 1602, an application in the first device that is to be switched to the mobile phone for running.

S506: If it is detected that the user selects a first application from the application list, the mobile phone switches the first application that is being run on the first device to the mobile phone for running.

The control center 1602 shown in FIG. 16(*b*) is still used as an example. After the mobile phone displays the application list 1604 in the smartwatch in the control center 1602, the user may select, from the application list 1604, a specific application that needs to be continued in the current content continuation task. If it is detected that the user selects a sport app (that is, the first application) from the application list 1604, it indicates that the user needs to switch the sport app that is being run on the smartwatch to the mobile phone for continuous playing.

Figure 17A:
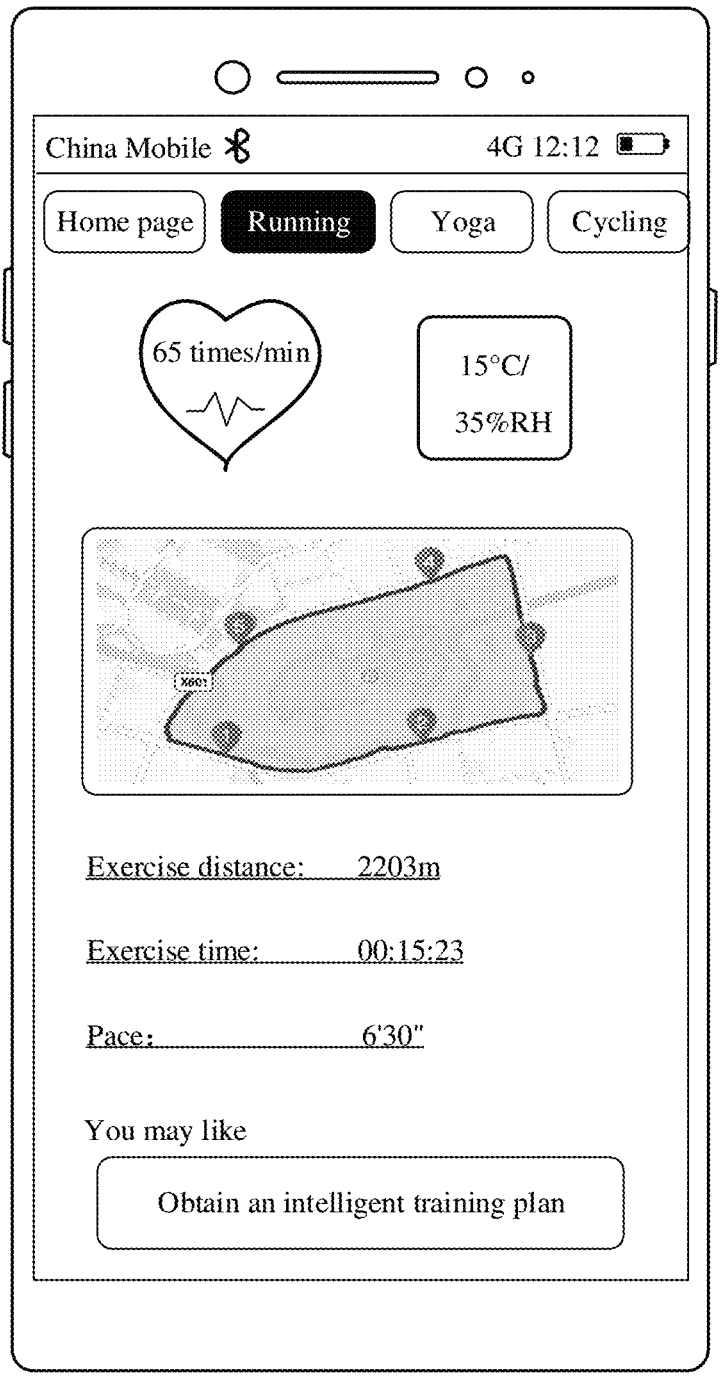
FIG. 17(a) and FIG. 17(b) are a schematic diagram 14 of an example application scenario of a content continuation method according to an embodiment of this application.
Figure 17B:

In this case, as shown in FIG. 17(*a*) and FIG. 17(*b*), in response to the operation of selecting the sport app from the application list 1604 by the user, the mobile phone may request the smartwatch used as the source device to switch the sport app that is being run to the mobile phone (that is, the target device) for continuous running. In this way, content in the sport app in the smartwatch is switched to the mobile phone for continuous playing, to complete the current content continuation task. For example, if a sports app is also installed in the mobile phone, the mobile phone may open the installed sport app, to implement continuous playing of the sport app from the smartwatch to the mobile phone. For another example, the mobile phone may alternatively send a continuation instruction of the sport app to the smartwatch, and the smartwatch used as the source device may switch the sport app that is being run to the mobile phone (that is, the target device) in response to the continuation instruction, to implement continuous playing of the sport app from the smartwatch to the mobile phone.

Figure 18A:
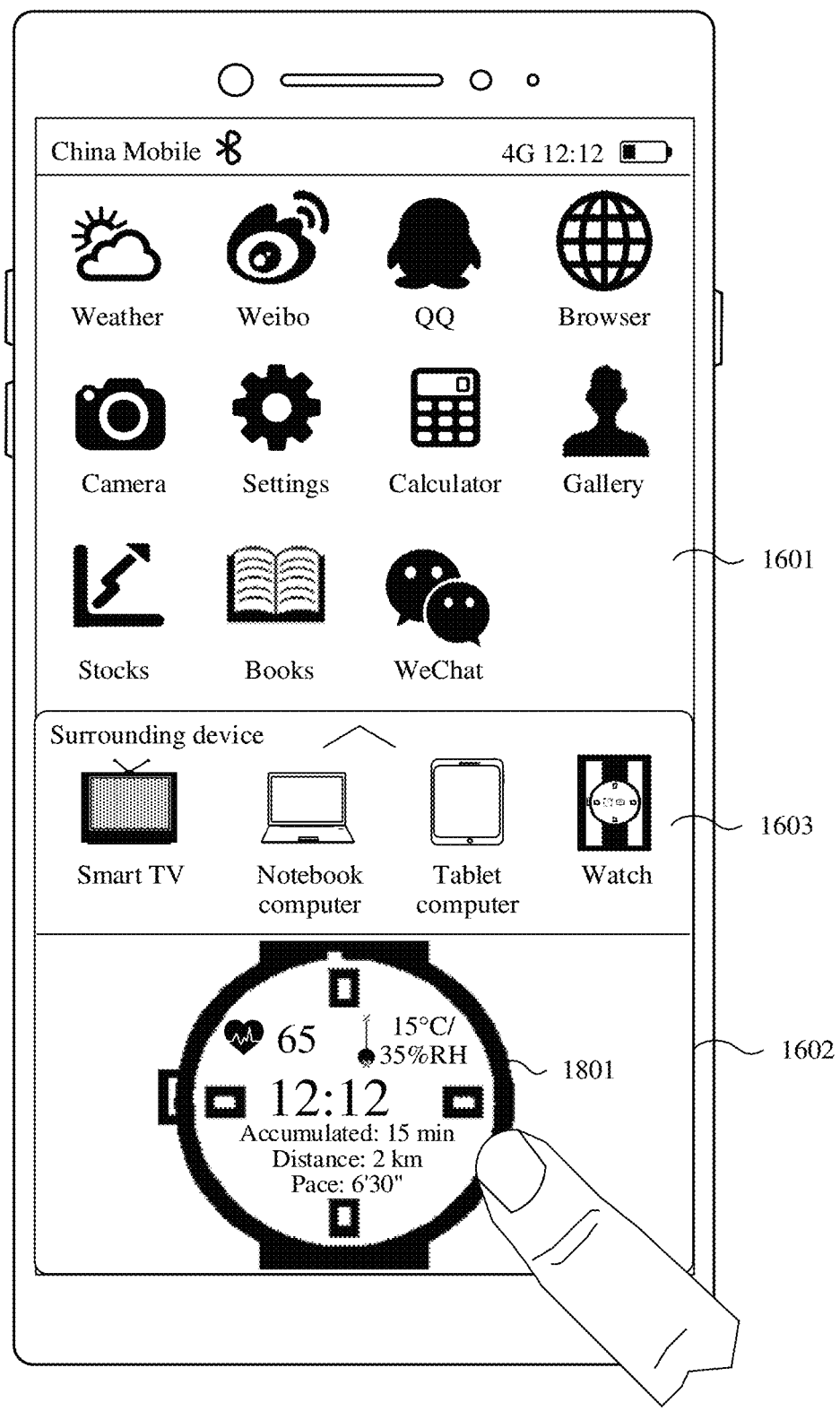
FIG. 18(a) and FIG. 18(b) are a schematic diagram 15 of an example application scenario of a content continuation method according to an embodiment of this application.
Figure 18B:
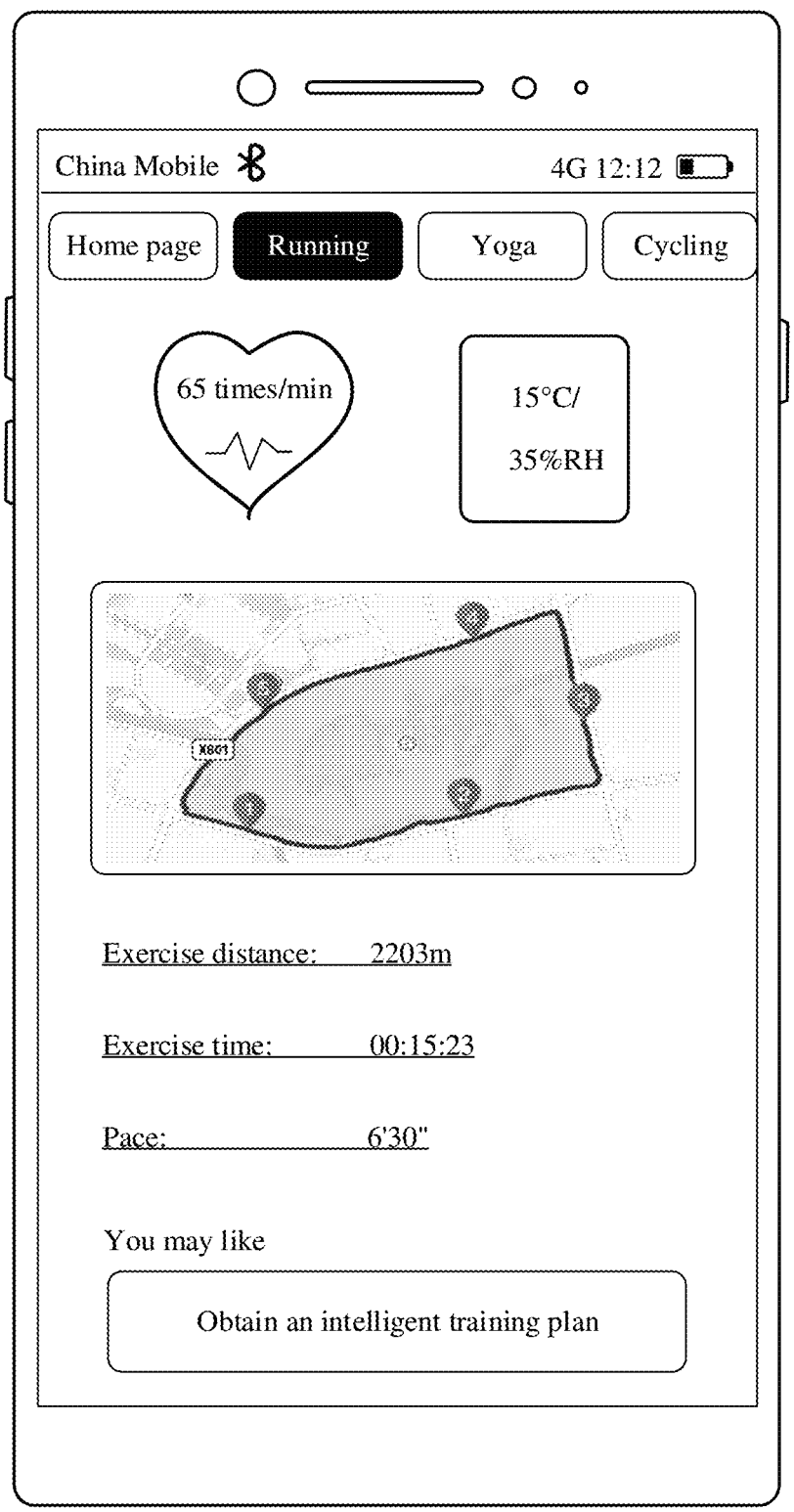

Alternatively, as shown in FIG. 18(*a*), after the mobile phone used as the target device displays, in the control center 1602, the list 1603 of devices that are in the content continuation system 200 and that are configured to perform content continuation, if it is detected that the user selects an identifier of a smartwatch from the device list 1603, the mobile phone may display, in the control center 1602, a picture 1801 that is being displayed by the smartwatch. In this case, if the user needs to switch a sport APP that is in the smartwatch (that is, the source device) and that corresponds to the picture 1801 to the mobile phone (that is, the target device) for continuous playing, the user may tap or double-tap the play content 1801. In this case, in response to the operation of tapping or double-taping the play content 1801 by the user, as shown in FIG. 18(*b*), the mobile phone may be used as the target device to switch the sport app that is being in the smartwatch to the mobile phone for continuous playing.

It can be learned that, in the content continuation method provided in this application, the mobile phone may display, in the control center, one or more electronic devices that can currently perform content continuation with the mobile phone, so that the user can quickly select an electronic device that participates in a current content continuation task. After the user selects an electronic device from the control center, the mobile phone may further determine, based on currently played content in the mobile phone, whether a role played by the mobile phone in the current content continuation task is a source device or a target device. Therefore, the mobile phone is triggered to serve as the source device to switch content in the mobile phone to the electronic device selected by the user for playing, or the mobile phone is triggered to serve as the target device to continuously play content in another electronic device. This reduces operation complexity of performing cross-device content continuation by the user, and improves user experience.

An embodiment of this application provides an electronic device. The electronic device may be a source device or a target device of a content continuation task, and the electronic device may perform a content continuation task with another electronic device in a content continuation system. The electronic device includes a processor, and a memory, a communications module, an input device, and an output device that are connected to the processor. The input device and the output device may be integrated into one device. For example, a touch sensor may be used as an input device, a display may be used as an output device, and the touch sensor and the display may be integrated into a touchscreen.

Figure 19:
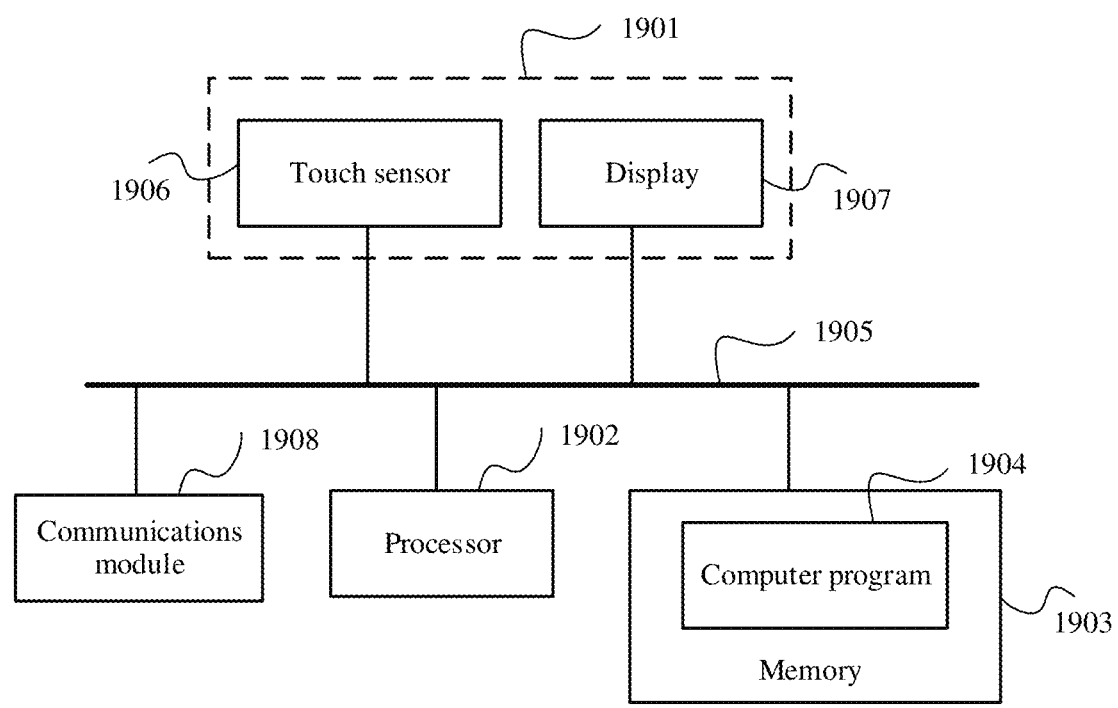
FIG. 19 is a schematic diagram 2 of a structure of an example electronic device according to an embodiment of this application.

In this case, as shown in FIG. 19, the electronic device provided in this embodiment of this application includes: a touchscreen 1901, where the touchscreen 1901 includes a touch sensor 1906 and a display 1907; one or more processors 1902; a memory 1903; a communications module 1908; one or more application programs (not shown); and one or more computer programs 1904. The foregoing devices may be connected by using one or more communications buses 1905. The one or more computer programs 1904 are stored in the memory 1903 and executed by the one or more processors 1902. The one or more computer programs 1904 include instructions, and the instructions may be used to perform the steps in the foregoing embodiment.

For example, the processor 1902 may be specifically the processor 110 shown in FIG. 4, the memory 1903 may be specifically the internal memory 121 shown in FIG. 4, the display 1907 may be specifically the display 194 shown in FIG. 4, and the touch sensor 1906 may be specifically the touch sensor in the sensor module 180 shown in FIG. 4. This is not limited in this embodiment of this application.

In some embodiments, this application further provides a graphical user interface (GUI). The graphical user interface may be stored in the foregoing electronic device. For example, the graphical user interface may be specifically a graphical user interface generated when the electronic device performs the foregoing content continuation method. For example, the graphical user interface may be the graphical user interface shown in any one of FIG. 2 and FIG. 3(a) and FIG. 3(b) or FIG. 5 to FIG. 18(a) and FIG. 18(b).

The foregoing descriptions about implementations allow a person skilled in the art to understand that, for the purpose of convenient and brief description, division into the foregoing function modules is used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiment.

Function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely non-limiting examples of specific implementations, and are not intended to limit the protection scope, which is intended to cover any variation or replacement within the technical scope disclosed in the embodiments of this application. Therefore, the claims shall define the protection scope.

What is claimed is:

1. A content continuation method, comprising:
    displaying and/or playing, by a first electronic device, a first content while running a first application;
    displaying, by the first electronic device, a first interface comprising a plurality of display items representing one or more electronic devices, the one or more electronic devices and the first electronic device are connected and are configured to perform one or more content continuation tasks;
    receiving, by the first electronic device, a first selection operation of identifying a second electronic device among the one or more electronic devices represented by the plurality of display items from a user;
    in response to the first selection operation, switching, by the first electronic device, the first content being displayed and/or played on the first electronic device to the second electronic device for continuous display and/or playing as a part of a first content continuation task;
    after the switching of the first content being displayed and/or played on the first electronic device to the second electronic device for continuous display and/or playing, displaying, by the first electronic device, a second interface comprising a plurality of display items including a first display item and a second display item, the first display item indicating that the first content has been switched from the first electronic device to the second electronic device for continuous display and/or playing as the part of the first content continuation task, and the second display item indicating a second content has been switched from the first electronic device to a fourth electronic device for continuous display and/or playing as a part of a second content continuation task;
    receiving, by the first electronic device, a second selection operation of identifying both 1) the first content continuation task from a plurality of content continuation tasks and 2) a third electronic device among a first set of electronic devices corresponding to the first content continuation task, from the user;
    in response to the second selection operation, directly switching, by the first electronic device, the first content being displayed and/or played on the second electronic device to the third electronic device for continuous display and/or playing as a part of the first content continuation task;
    receiving, by the first electronic device, a third selection operation of identifying both 1) the second content continuation task from the plurality of content continuation tasks and 2) a fifth electronic device among a second set of electronic devices corresponding to the second content continuation task, from the user; and
    in response to the third selection operation, directly switching, by the first electronic device, the second content being displayed and/or played on the fourth electronic device to the fifth electronic device for continuous display and/or playing as a part of the second content continuation task.

2. The method according to claim 1, further comprising:
    when the first application is of a preset type, determining, by the first electronic device, that a source device of the first content continuation task is the first electronic device; and
    when the first application is not of the preset type, determining, by the first electronic device, that a target device of the first content continuation task is the first electronic device.

3. The method according to claim 2, wherein the first application of the preset type comprises a video call application, a video play application, an office application, a game application, or an audio application.

4. The method according to claim 1,
wherein the second interface comprises one or more display items representing the first set of electronic devices and the second set of electronic devices.

5. The method according to claim 1, wherein
when the first application is a video call application or a video play application, the first set of electronic devices comprises a large-screen device;
when the first application is an office application, the first set of electronic devices comprises an office device;
when the first application is a game application, the first set of electronic devices comprises a display device; or
when the first application is an audio application, the first set of electronic devices comprises an audio output device.

6. The method according to claim 1, wherein the first interface comprises a shortcut of a first contact, and the method further comprises:
in response to a preset operation performed by the user on the shortcut of the first contact, displaying, by the first electronic device on the first interface, a display item representing a sixth electronic device among the one or more electronic devices; and
in response to an operation of dragging the shortcut of the first contact to the display item representing the sixth electronic device by the user, switching, by the first electronic device, content of a video call with the first contact to the sixth electronic device.

7. The method according to claim 1, wherein the displaying of the first interface comprises:
in response to a first operation performed by the user on the first interface, displaying, by the first electronic device, a first menu on the first interface; and
in response to a second operation performed by the user on the first menu, displaying, by the first electronic device, a second menu on the first interface.

8. A first electronic device, comprising:
a touchscreen including a touch sensor and a display;
one or more processors;
a memory; and
a communications module, wherein
the memory stores one or more computer programs, and the one or more computer programs comprise instructions that, when executed by the first electronic device, enable the first electronic device to perform operations comprising:
displaying and/or playing a first content while running a first application;
displaying a first interface comprising a plurality of display items representing one or more electronic devices, the one or more electronic devices and the first electronic device are connected and are configured to perform one or more content continuation tasks;
receiving a first selection operation of identifying a second electronic device among the one or more electronic devices represented by the plurality of display items from a user;
in response to the first selection operation, switching the first content being displayed and/or played on the first electronic device to the second electronic device for continuous display and/or playing as a part of a first content continuation task;
after the switching of the first content being displayed and/or played on the first electronic device to the second electronic device for continuous display and/or playing, displaying a second interface comprising a plurality of display items including a first display item and a second display item, the first display item indicating that the first content has been switched from the first electronic device to the second electronic device for continuous display and/or playing as the part of the first content continuation task, and the second display item indicating a second content has been switched from the first electronic device to a fourth electronic device for continuous display and/or playing as a part of a second content continuation task; and
receiving a second selection operation of identifying both 1) the first content continuation task from a plurality of content continuation tasks and 2) a third electronic device among a first set of electronic devices corresponding to the first content continuation task, from the user;
in response to the second selection operation, directly switching the first content being displayed and/or played on the second electronic device to a third electronic device for continuous display and/or playing as a part of the first content continuation task;
receiving a third selection operation of identifying both 1) the second content continuation task from the plurality of content continuation tasks and 2) a fifth electronic device among a second set of electronic devices corresponding to the second content continuation task, from the user; and
in response to the third selection operation, directly switching the second content being displayed and/or played on the fourth electronic device to the fifth electronic device for continuous display and/or playing as a part of the second content continuation task.

9. The first electronic device according to claim 8, wherein the operations further comprise:
when the first application is an application of a preset type, determining that a source device of the first content continuation task is the first electronic device; and
when the first application is not the application of the preset type, determining that a target device of the first content continuation task is the first electronic device.

10. The first electronic device according to claim 8, wherein after the switching, by the first electronic device, content being displayed and/or played on the first electronic device to the second electronic device for continuous display and/or playing, the first electronic device is further configured to perform operations comprising:
marking a display item representing the second electronic device in the second interface.

11. The first electronic device according to claim 2,
wherein the second interface comprises one or more display items representing the first set of electronic devices and the second set of electronic devices.

12. The first electronic device according to claim 8, wherein the first set of electronic devices corresponding to the first content continuation task comprises at least two electronic devices configured to run the first application to play or display the first content.

13. The first electronic device according to claim 8, wherein the second set of electronic devices corresponding to the second content continuation task comprises at least two electronic devices configured to play or display the second content.

* * * * *